(12) United States Patent
Hahn et al.

(10) Patent No.: US 8,312,997 B2
(45) Date of Patent: *Nov. 20, 2012

(54) MODULE FOR PROCESSING A FLUID AND A PROCESS FOR MANUFACTURE OF SAME

(75) Inventors: Denis Hahn, Schwaebisch Gmuend (DE); John Miller, New York, NY (US); Wolfgang Diemer, Waldstetten (DE); Martin Zeiler, Schwaebisch Gmuend (DE); Klaus Feifel, Schwaebisch Gmuend (DE)

(73) Assignee: Pall Corporation, Port Washington, NY (US)

( * ) Notice: Subject to any disclaimer, the term of this patent is extended or adjusted under 35 U.S.C. 154(b) by 589 days.

This patent is subject to a terminal disclaimer.

(21) Appl. No.: 12/526,539

(22) PCT Filed: Feb. 1, 2008

(86) PCT No.: PCT/EP2008/000805
§ 371 (c)(1),
(2), (4) Date: Nov. 13, 2009

(87) PCT Pub. No.: WO2008/098689
PCT Pub. Date: Aug. 21, 2008

(65) Prior Publication Data
US 2010/0059422 A1 Mar. 11, 2010

Related U.S. Application Data

(60) Provisional application No. 60/889,754, filed on Feb. 14, 2007.

(51) Int. Cl.
*B01D 27/00* (2006.01)
*B01D 29/07* (2006.01)
*B01D 35/28* (2006.01)

(52) U.S. Cl. ............... 210/494.1; 210/494.3; 210/497.1; 210/435; 210/437; 210/457

(58) Field of Classification Search .................. None
See application file for complete search history.

(56) References Cited

U.S. PATENT DOCUMENTS 2,173,978 A 9/1939 Pennebaker
2,339,703 A * 1/1944 Kamrath ...................... 210/457
(Continued)

FOREIGN PATENT DOCUMENTS
DE 197 05 856 9/1998
(Continued)

*Primary Examiner* — Benjamin Kurtz
(74) *Attorney, Agent, or Firm* — Leydig, Voit & Mayer, Ltd.

(57) ABSTRACT

The invention relates to a module for processing a fluid having a body of wound layers of a sheet material, the body having inner and outer surfaces, first and second end faces and a passage extending along the winding axis of said body in fluid communication with the inner surface, the sheet material having openings forming at least three types of channels, the channels extending from the inner surface to the outer surface, a first type of channel being open at the outer surface of the body and closed at the other end, a second type of channel being open at the inner surface of the body, in fluid communication with said passage and closed at the other end, a third type of channel being closed at both ends thereof and positioned such as to receive fluid from one or more channels of the first or second type.

44 Claims, 10 Drawing Sheets

U.S. PATENT DOCUMENTS

| | | | |
|---|---|---|---|
| 2,816,665 | A | 12/1957 | Layte et al. |
| 5,164,085 | A | 11/1992 | Spokoiny et al. |
| 5,232,595 | A | 8/1993 | Meyer |
| 5,520,801 | A | 5/1996 | Gerber et al. |
| 6,391,193 | B1 | 5/2002 | Luka |
| 2004/0035783 | A1 | 2/2004 | Strohm et al. |
| 2005/0155923 | A1* | 7/2005 | Diemer et al. ............. 210/345 |
| 2008/0142449 | A1 | 6/2008 | Diemer et al. |
| 2008/0169234 | A1 | 7/2008 | Diemer et al. |
| 2008/0223781 | A1 | 9/2008 | Diemer et al. |
| 2008/0230470 | A1 | 9/2008 | Diemer et al. |

FOREIGN PATENT DOCUMENTS

| | | |
|---|---|---|
| DE | 197 52 376 | 5/1999 |
| DE | 198 48 389 | 5/2000 |
| DE | 101 50 273 | 4/2003 |
| DE | 299 10 958 | 10/2009 |
| EP | 0 635 296 | 1/1995 |
| EP | 1 035 901 | 9/2000 |
| EP | 1 165 204 | 1/2002 |
| WO | WO 99/47234 | 9/1999 |
| WO | WO 02/053257 | 7/2002 |
| WO | WO 03/033101 | 4/2003 |
| WO | WO 03/041829 | 5/2003 |
| WO | WO 2008/098688 | 8/2008 |
| WO | WO 2008/098690 | 8/2008 |

* cited by examiner

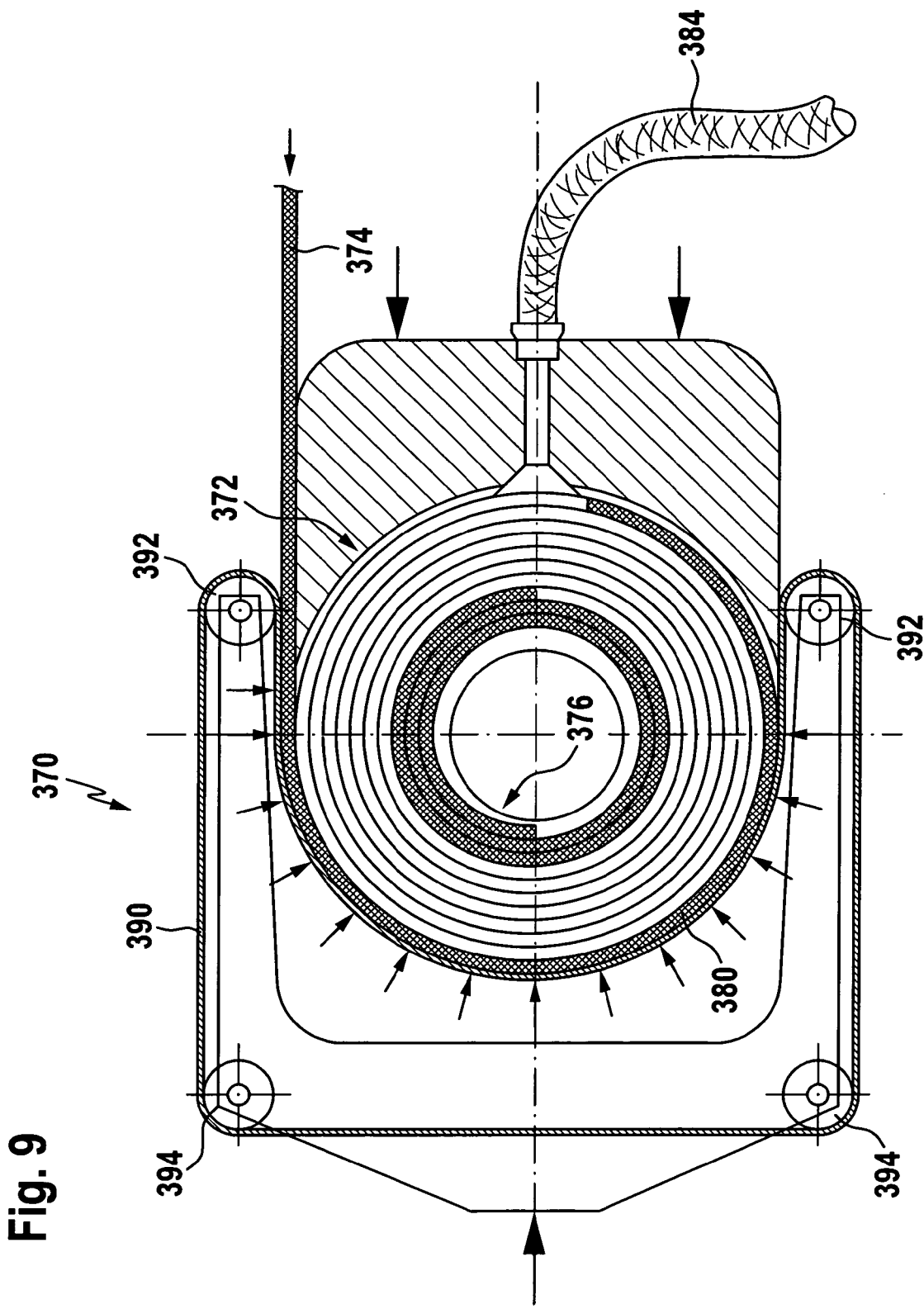

MODULE FOR PROCESSING A FLUID AND A PROCESS FOR MANUFACTURE OF SAME

FIELD OF THE INVENTION

The present invention relates to a module for processing a fluid and a process for manufacture of same.

BACKGROUND OF THE INVENTION

The module according to the present invention comprises a body of wound layers of a sheet material, said body having an inner and an outer peripheral surface, a first and a second end face, a winding axis and a passage extending along the winding access of said body and in fluid communication with said inner peripheral surface. The sheet material has a plurality of openings formed therein, said openings forming different types of channels within the wound layers of sheet material of said body, said channels extending in a direction from the inner peripheral surface to the outer peripheral surface.

A first type of channel formed in said body is open at one end at the outer peripheral surface of the body and closed at the other end located closer to the inner peripheral surface. A second type of channel is open at one end at the inner peripheral surface of the body and in fluid communication with said passage and closed at the other end located closer to the outer peripheral surface.

The different types of channels are separated from one another by portions of sheet material such that fluid to be filtered and entering one type of channels may reach the other type of channel and exit the filter module only by migrating through a portion of said body formed by the sheet material separating these different types of channels.

One type of channel is communicating with a port, e.g., a fluid inlet of said filter module. Channels of this type are called in the following inlet channels; another type of channels is communicating with another port, e.g., a fluid outlet of said filter module and these channels are called in the following outlet channels.

Modules of this type are generally known as filter modules, for example, from the PCT application WO 03/041829 A2.

Another filter module of this type is known, for example, from U.S. Pat. No. 2,339,703.

While the filter modules as mentioned above provide an interesting approach to a filter module of filter paper (U.S. Pat. No. 2,339,703) and other filter materials (WO 03/041829), they have been found ineffective in a number of aspects.

Furthermore, there is a need for modules for processing a fluid in general with a simple but easily adaptable structure to various processing tasks.

In many applications and production and cleaning processes, different process steps are required. These are carried out separately, performing one step after the other. This is especially true for filtration processes, where the successful performance of the first filtration step is a prerequisite for the start of the second filtration step.

This necessary sequence of steps quite often results in a process layout where each filtration step has its own design, starting from a own housing for the filtration media, going on to separate pumps, covering all the necessary surroundings and possibly even ending up in two separate cleaning processes. This is especially true when using closed systems.

High investment costs, unnecessary long process times, additional costs for storage equipment, product losses due to unnecessary dead volume, and additional cleaning costs are only a few of the disadvantages resulting. To solve and avoid this abundance of costs, time and equipment is one of the objects of the present invention.

Another object of the present invention is to provide an improved processing module of the above-described type which provides a longer service life for the filter modules by simple and cost effective means a great versatile for different fluid processing applications.

SUMMARY OF THE INVENTION

The objects are achieved by a module for processing a fluid comprising a body of wound layers of a sheet material,
said body having an inner and an outer peripheral surface, a first and a second end face and a passage extending along the winding axis of said body and in fluid communication with said inner peripheral surface,
said sheet material having a plurality of openings formed therein,
said openings forming at least three types of channels within the wound layers of sheet material of said body,
said channels extending in a direction from the inner peripheral surface to the outer peripheral surface,
a first type of channel(s) being open at one end at said outer peripheral surface of the body and closed at the other end located adjacent to said inner peripheral surface,
a second type of channel(s) being open at one end at said inner peripheral surface of the body, in fluid communication with said passage and closed at the other end located adjacent to said outer peripheral surface,
a third type of channel(s) being closed at both ends thereof, said channel(s) of the third type being positioned in said body such as to receive fluid from one or more channels of the first or second type, whereas one or more channels of the other one of the first and second type of channels receives fluid from the third type of channels,
said channel(s) of the one type being separated from the channel(s) of the respective other types by portions of sheet material,
the first or second type of channel(s) communicating with a fluid inlet of said module (inlet channels), the other type of the first and second channel(s) communicating with an outlet of said module (outlet channels).

In a simple configuration, the body of the filter module may have one inlet and one outlet channel as well as a third type channel. For practical purposes, in most applications, however, the body of the filter module will have both a plurality of inlet and outlet channels as well as third type channels.

The third type of channels may be used in various ways. Their first function is to collect fluid from the inlet channels and provide a volume where the fluid accumulates and from where it travels to the outlet channels. The fluid may thereby by redistributed within the body such that any irregularities, e.g., partial blockages of surface areas on the inlet side, will have no or at least reduced influence on the fluid flow from the third type of channels to the outlet channels.

Apart from this first function, numerous other functions may be assigned to the third type of channels depending on the fluid processing application for which the inventive module is designed. Such additional function will become apparent from the following description.

It is readily understood that the third type of channels may be used in different functions within one body of wound layers and the fluid flow within the body may be directed such it passes from an inlet surface area (inlet channels) to a third type of channels having one function to a further third type of channels having a function different from the one function and only then on to the outlet channels.

According to one aspect of the present invention, the inlet and outlet channels are positioned in the body such that they do not intersect the same layers of sheet material. In other words, the inlet and the outlet channels are positioned in different radial sections of the cylindrical body of wound layers. The third type of channels preferably will intersect layers including inlet as well as outlet channels.

This allows for a rather compact design of the module, especially in cases where the inlet and outlet channels are positioned in areas of the body radially separated by one or more separating layers of sheet material. In such cases the inlet and outlet channels may be positioned in an identical axial position along the winding axis of the body.

If at least one of the separating layers is impervious to the fluid in radial direction of the body, only one separating layer would be needed in order to provide for the preconditions to have inlet and outlet channels in the same axial position of the body radially aligned. In slightly modified embodiments, one or more separating layers may be present which are pervious to the fluid in radial direction of the body. However, it is of essence that a fluid flow directly from the inlet channel to the outlet channel is avoided in order not to bypass the third type of channels.

The ratio of the radial extensions of the inlet and outlet channels is often about 10:10 but may vary considerably and range up to 80:10. This means that inlet channels may extend in radial direction over a length which is eight times of the length of the radial extension of the outlet channels.

A ratio of the radial extension which favors the inlet channels over the outlet channels is of especial advantage in cases where relatively large surfaces on the inlet channel side are required whereas the fluid flow in the outlet channels may be provided without any distortion of the processing of the fluid by relatively small surface areas of the channels.

According to this one aspect of the present invention, the body of wound layers of sheet material may advantageously be manufactured of a first sheet material in the cylindrical portion of the body accommodating the inlet channels, and may be made of a second sheet material which is different from the first one in another cylindrical portion of the body of wound layers accommodating the outlet channels.

A third type of sheet material may be used in order to provide for the separating layers which are radially interposed between the cylindrical portions of the body accommodating inlet and outlet channels, respectively.

In many filter applications where the inventive module may be used, the portion of the body accommodating the outlet channels may be regarded as constituting a so called security zone. In such a configuration the module may be used to its full capacity without fear of contaminating the fluid downstream of the module with unprocessed fluid. If the module has been used up in its portion in between the inlet channels up to the third channels break through of the module occurs. However, because of the security zone contaminants may not reach the filtrate side. The personnel only then would have to exchange the module for a new one.

In order to facilitate detecting of the begin of the use of the security zone, it is preferable to have indicator means included at least in one of the channels of the third type providing for a signal that the module should be exchanged for a new or a regenerated one. Still because of the security zone it is not necessary to have the exchange effected immediately since continued operation is safe for a further predefined time period.

As discussed above, according to one aspect of the present invention, the inlet and outlet channels may be located in different cylindrical portions of the body of wound layers which are radially distinct from one another. In such a case, it is possible to locate the inlet and outlet channels in essentially the same ring shaped area or portion of the body, whereas the third type of channels is located in an area or areas distinct from such ring shaped areas.

In other applications where it is important to have large surface areas for the inlet channels as well as the outlet channels, it is preferred that each type of channels is positioned in the body in distinct ring shaped portions.

The following explanations of the present invention refer to configurations with a plurality of channels, however, they will apply mostly also to the initially described simple configuration.

According to a further aspect of the present invention at least the majority of the openings of a layer (or one winding) of sheet material forming the inlet channels incompletely register with corresponding openings of an adjacent layer of sheet material. This feature is of special importance when the inventive module is used as a filtration module.

By the specific size, shape and/or arrangement of the openings in the sheet material forming the inlet channels such that the openings of one layer incompletely register with the openings of the adjacent layer also contributing to the formation of the inlet channels provided in the body, an increased surface area is provided. Such incomplete registration of the openings may provide for a drastic increase in surface area, but at the same time, the increase in pressure resistance or pressure drop remains limited to acceptable values.

Thus, the surface area provided by the inlet channels of the inventive modules is no longer a limiting factor for the filter capacity of the filter module, while the surface area provided by the outlet channels, i.e., downstream of the filtration module, usually never was limiting the service life of the modules in filtration applications.

The dimensions of the openings in their smallest aspect should not be below about 0.5 mm except for sheet materials which do not swell in contact with the fluid to be filtered. Otherwise an undue increase in pressure drop may be observed. Preferably the smallest aspect is about 1 mm or more. In case of round openings this aspect corresponds to the diameter of the openings. The largest aspect of the openings may largely vary.

It is readily understood that the shape of the openings is not limited to a round, oval or elliptic form or slot-like shape, but the openings may have any polygonal form, e.g., rectangular or square shaped.

Incomplete registering of the openings provides a remarkable effect of increase in surface area resulting in an increased dirt capacity in applications involving filtration and therefore in an increased service life of the module when the overlap of the openings in the average amounts to about 90% or less. Therefore, for applications which are rather sensitive for increase of pressure resistance on the side of the inlet channels, an overlap of the opening of about 90% in the average may provide for a remarkable advantage over the wrap rolls disclosed in the prior art.

The overlap percentage mentioned above and below relates an overlap of areas of sheet material occupied by the respective openings calculated for the openings forming the inlet channels of the whole body.

For applications which are less sensitive to pressure resistance or pressure drop, the incomplete registering may correspond to an average overlap of the openings of about 80% or less which provides for a still increased effect of larger surface area on the inlet channel side.

When the incomplete registering of the openings corresponds to an average overlap of less than about 50% the effect of increase in dirt capacity and service life is no longer as pronounced as in the cases discussed above, whereas at the same time the increase of pressure resistance of the inlet channels becomes a factor which may not be neglected anymore.

Therefore, the incomplete registering of the openings preferably corresponds to an average overlap of about 50% or more.

It is easily understood by the person of ordinary skill in the art that the advantageous effect of increase in surface area on the inlet channel side not necessarily requires that essentially all of the openings forming inlet channels incompletely register with the corresponding opening of the adjacent layer(s). It is, however, preferred that at least about 75% of the openings (by number) forming the inlet channels, more preferably at least about 85% incompletely register with the corresponding openings of an adjacent layer. This measure ensures a more homogeneous increase of inlet channel surface throughout the body.

While the incomplete registering of the openings could be achieved by using openings of different shape and/or size, it is preferred according to the present invention to use the openings for each type of channels of a substantially uniform size and shape, which greatly facilitates the production of the sheet material having the openings formed therein.

This also facilitates the design of the filter module and the tools for manufacturing same.

The afore-discussed teaching of incomplete registering of the openings forming the inlet channels is in contrast to the teaching of U.S. Pat. No. 2,339,703, which specifically requires that the openings register with one another. This reference specifically calls for a suitable spacing of the openings to cause the openings to mate. Anything more than a slightly irregular positioning of the openings resulting in slightly irregular edges of the channels is not accepted to avoid interference with the effectiveness of the filter.

The same teaching may be derived from WO 03/041829 A2. This reference allows an orientation of the channels with respect to the winding axis of 30° to 90°.

According to another aspect of the present invention, a minimum configuration of the modules can be obtained wherein the openings formed in the sheet material of the body form second and third type of channels within the wound layers of sheet material of said body, whereas the first type of channels being functionally represented by the first and second end faces of the body. Therefore, the sheet material forming said body will not have openings for forming the first type of channels such that a module may be obtained which is minimal in height as measured along the winding axis of the module. The third type of channels will have to be provided in a first and a second ring shaped portion of said body, the second type of channels being provided in a third ring shaped portion of the body which is different from the first and second ring shaped portions. The third ring shaped portion of the body will have to be positioned in axial direction of said body in between the first and second ring shaped portions accommodating the first type of channels. In this minimum configuration the body will essentially consist of said three ring shaped portions.

In many cases the first and second end faces of the body will provide the inlet surface area for the module, whereas the second type of channels will provide for the outlet. It is, however, noted that in some applications, the module in its minimum configuration may also be operated with a second type of channels being inlet channels and the first and second end faces of the body providing the outlet.

The foregoing explanations concerning the inventive modules will also mostly apply to this minimum configuration and also the details following on other aspects of the present invention will likewise apply to this minimum configuration of the inventive module.

For all configurations of the inventive module, it is preferred that the third type of channels extends essentially over the whole radial distance between the inner and outer peripheral surfaces.

Furthermore, as mentioned above, the third type of channels provide an ideal position for accommodating indicator means for monitoring the processing of the fluid.

In one specific embodiment, the indicator means includes a pressure sensing element.

In another embodiment the indicator means includes a pH sensing element.

In still another embodiment the indicator means includes an electrical conductivity sensing means.

In yet another embodiment the indicator means include redox potential sensing means.

Furthermore a temperature sensing element may be used as a component of the indicator means.

It is preferred that the indicator means include signal transmission means which are preferably wireless transmission means, in order to avoid any structural distortion of the wound layers of the body.

In addition or alternatively, the third type of channels as indicated above may be used to perform various functions beside their first function to receive, eventually redistribute and pass on fluid entering the module from the inlet surface areas provided by the inlet channels and/or first and second end faces of the body.

Such additional functions include accommodating of a particulate treatment agent which may be especially selected from filter aids, adsorption material, reagents and catalytic components. Thus, the provision of third type of channels offers a broad variety of possibilities to process the fluid or components contained and transported within the fluid.

According to another aspect of the present invention the openings forming the channels are preferably separated from one another by stays of sheet material. The stays may be easily designed to provide enough stability to the body to withstand a substantial pressure differential during operation of the module.

In a preferred embodiment the openings forming the inlet channels have an extension in the winding direction of the sheet material which is longer than the extension of the stays separating these openings from one another in the same direction. Such type of design of the sheet material will avoid that stays in between openings may overlay an opening of an adjacent layer of sheet material and disturb the channel structure.

The structure of the channels, especially of the inlet channels, may be of a simple, more or less tubular form showing projections of recesses in the surface of the channels which result from the incomplete registering of the openings forming the inlet channels. However, the form of the channels can also be much more complex. In case the openings of the inlet channels have an extension in the winding direction much longer than the extension of the stays measured in the same direction, a plurality of openings may form inlet channels that constitute together a contiguous ring shaped channel structure which is intersected at various portions by stays separating the openings from one another.

In this case, a relatively large surface area is provided per inlet channel while at the same time, the stays of sheet material intersecting the channel volume still provide for sufficient stability, not only of the structure of the inlet channels during operation of the module but also facilitate winding of the sheet material to form a body in a precise and repeatable manner.

A rather simple form of channels is a ring shaped volume which is arranged concentrical to the winding axis. Since this channel form provides for a maximum of volume, such channels are preferred for the third type of channels. In addition, such channels are to provide with a treatment agent.

In order to maximize the surface area of the inlet channels versus the surface area of the outlet channels while keeping consumption of sheet material at a minimum, it is preferred that the number of openings forming inlet channels is higher than the number of openings forming outlet channels.

Another measure to promote such an effect is to make the openings forming the outlet channels smaller than the openings forming the inlet channels.

A significant effect of this measure may be observed when the difference in size of the openings amounts to about 10% or more, based on the size of the openings forming the outlet channels.

In order to make maximum use of the sheet material used to produce the body, the number of inlet channels is preferably higher than the number of outlet channels.

The number of inlet channels may be two fold or more of the number of outlet channels.

Calculations done by the present inventors show that when the number of inlet channels is approximately threefold the number of outlet channels, a maximum use of the sheet material is possible. This maximum use not only relates to its use to provide a stable structure of the body but also to its effect on the capacity of the module in applications including a filtration step, which means its service life.

Preferably, the openings in a sheet material for each type of channels are arranged in parallel rows. This allows an easy design of the sheet material and the arrangement of the various types of channels so as to make maximum use of the sheet material.

Preferably the openings forming the inlet channels are arranged in groups of two or more adjacent rows, whereas the openings forming the outlet channels are arranged in groups of a lesser number of rows. The number of rows in a group of rows of openings forming outlet channels may be just one.

This allows an increase of surface area for the inlet channels while keeping the surface area of the outlet channels to the minimum necessary. During operation the fluid entering the inlet channels will migrate through the sheet material and be collected in the adjacent third type of channels from where it again migrates through the sheet material to be finally collected in outlet channels.

Maximum use of the sheet material requires that more than one inlet channel provide fluid to be processed for one outlet channel.

In order to facilitate the incomplete registering of the openings, in a preferred embodiment according to the present invention the openings forming the inlet channels are arranged in a predefined pattern, each pattern comprising a number of openings, said pattern being repeated multiple times along the length or winding direction of the sheet material such that the distance between openings of the same kind within one pattern is different from the distance of adjacent openings of the same kind belonging to two subsequent patterns.

This means that, for example, when a punching tool is used to provide a number of openings in the sheet material, the punching tool is used with an offset for forming the adjacent opening pattern such that the distance between adjacent openings formed in two punching operations is different from the distance between adjacent openings resulting from one punching operation.

According to another aspect of the present invention the design of the module may be advantageously used to provide a depth filter characteristic. To that effect, the sheet material is selected from a depth filter material and said sheet material of the module is maintained in a compressed state, such that the body of wound layers constitutes a depth filter unit precluding bypasses. These measures ensure that the fluid to be filtered migrates through the depth filter material and does not find a shortcut from an inlet to a third type of channels and/or to an outlet channel between adjacent layers of sheet material.

It has been found that a compression of the sheet material, such that the thickness of the compiled layers of the body amounts to about 99% or less of the thickness of the same number of individual layers of sheet material, is often enough to solve the bypass problem. The amount of compression needed is of course depending on the compressibility of the sheet material itself so that with easily compressible sheet material a more pronounced compression of the body may be advantageous.

The compression of the body within the above mentioned limit is suitable for solving the bypass problem especially where the sheet material used is a material which swells in contact with the fluid to be treated. In such a case, in addition to the compression forces exerted on the sheet material in the dry state of the body, the forces created in the course of the swelling of the sheet material support providing an intimate contact of the adjacent layers of the sheet material within the body.

Furthermore, the forces generated upon swelling of the sheet material do not only act in the same direction as the compression forces but also in perpendicular directions thereof which further contributes to minimize the bypass risks.

The forces created by the swelling of the sheet material do not simply add to the compression forces when an elastically/plastically deformable sheet material is used. Part of the forces will then result in a partly permanent deformation of the microstructure of the depth filter material.

When a sheet material is used which does not swell in contact with the fluid to be filtered the restoring forces of the elastically or elastically/plastically deformable sheet material are solely responsible for maintaining the intimate contact of adjacent layers of sheet material. In such cases a somewhat higher compression of the body may be advisable.

The use of easily compressible sheet material opens up multiple opportunities to modify the filter characteristic of the module and to adapt the sheet material in the body to various filtration tasks without having the need to produce different types of sheet material. By varying the degree of compression of the body the permeability of the sheet material can be modified, resulting in modified retention and separation characteristics.

Typical sheet materials of cellulosic fibers have mass per unit area of about 300 to about 2.000 $g/m^2$ and a thickness of about 2 to about 7 mm, more preferably about 3 to about 6 mm. Sheet materials of cellulosic fibers with a thickness of about 4 to about 5 mm are most preferred because they allow a most economic drying process during the manufacturing of the sheets.

Further details with respect to compressing the sheet material will become apparent from the below discussion of the inventive process for manufacturing the inventive module.

In a number of applications, for example in the biopharmaceutical or food technology area, it is of utmost importance to use materials only which have been certified for the type of application.

In this respect, in a preferred embodiment of the present invention the body of wound layers essentially consists of a unitary material, which means that the body is essentially constituted by the sheet material itself not needing any sort of adhesive or other type of auxiliary agents or means to provide for a bypass-free depth filter material.

In order to provide safe closure of the channels at one end thereof, it is preferred when the innermost and outermost layers of sheet material, respectively, are compressed at least to the extent, the body as a whole is compressed.

This ensures that especially at the end portions of the channels no bypass or leakage may occur and again such measures avoid any use of adhesive or any other auxiliary material to that effect.

More preferably, at least several, e.g., three innermost and at least several, e.g., three outermost layers are compressed to an extent substantially corresponding to the degree of compression of the body as a whole. Of course, even more innermost and/or outermost layers may be used to provide a closure of the end portions of the channels, depending on the structure of the filter module and the application.

Alternatively, fluid impervious sheet material may be used for these portions of the body.

It is especially noted that the module according to the present invention may be provided without any sort of supporting structure and the inner peripheral surface of the module may constitute the passage itself.

It has been mentioned before already for various times that the sheet material may be compressible or non-compressible.

In a preferred embodiment, the sheet material comprises a matrix including a compressible material and/or a material which swells in contact with the fluid to be processed.

In either case, compression of the sheet material during manufacturing and maintaining the sheet material forming the body in a compressed state during operation of the module and/or the use of a material which swells in contact with a fluid to be processed, a body is provided which may be used as a depth filter unit avoiding the problem of bypass.

However, sheet material which is at least somewhat compressible is preferred since such material may be formed to a body which may be tested for bypass problems without having need to actually pass fluid through the module.

In contrast, the use of material which is swellable but essentially incompressible in the dry state requires bringing the material in contact with the fluid in order to provide the full function or characteristics of the module.

According to still another aspect of the present invention the sheet material may comprise a matrix incorporating an additive, said additive being preferably in particulate form.

Particulate form according to the present invention means any sort of particulate material being it, e.g., granular, fibrous or needle form.

The additive present in the sheet material amounts preferably up to about 70% by weight, based on the weight of the sheet material.

The additives may be of organic or inorganic origin.

This very broad range of additives available allows for an easy adaptation of the sheet material to various filtration tasks and also to influence the characteristic of the sheet material with respect to its compressibility or swellability.

It is understood from the foregoing that the module may be used for functions different from filtration, especially for fluid treatment, including ion exchange, catalytic reactions and the like with or without taking advantage of the possible filtration function of the module.

In a preferred embodiment of the present invention, the particulate additive is selected from porous particulate additives, so as to provide the opportunity to perform specific filtration tasks.

In another preferred embodiment, the additive may comprise a filter aid, which allows for specifically designing the sheet material for selected filtration applications.

In another preferred embodiment of the present invention, the additive may comprise a treatment agent which allows performing simultaneously to or instead of the filtration, a treatment of the fluid to be filtered.

In yet another embodiment, the additive comprises a reactive agent and the filtration module then provides for the opportunity to convert a component included in the fluid upon or instead of filtration of the same.

In another preferred embodiment, the additive may comprise an absorptive or adsorptive agent, which allows for further adaptation of the sheet material and its characteristic to a specific filtration task.

Examples for additives which may be used are kieselguhr, perlite, bentonite, activated carbon, zeolite, micro crystalline cellulose and PVPP (cross-linked polyvinylpyrrolidone).

Examples of filtration tasks for the various additives are as follows:

PVPP is preferably used in the stabilization of beer, since it allows removal of polyphenols.

Activated carbon is used to, e.g., remove proteins, colorants, pyrogens etc. from the fluid to be treated.

Kieselguhr and micro-crystalline cellulose improve the removal rate for fine particles. Micro-crystalline cellulose is preferred in applications where release of minerals from the additive into the filtrate might be of concern.

Perlite may be used to generate the so-called trubraum and improves thereby the dirt holding capacity.

Zeolite is an appropriate and versatile additive for binding metal ions, water and the like, depending on the specific structure and composition thereof.

Bentonite is a useful additive for the fining of wine.

The above-discussed additives may also be accommodated in the third type of channels as treatment agents.

Preferably the sheet material comprises a matrix including organic polymer material. The organic polymer material may be a naturally occurring organic polymer material like cellulosic fibers. Synthetic polymers, especially in the form of sintered or foamed polymeric materials or organic fiber materials are also preferred organic polymer materials.

Since many filtration applications need a sterile environment, in a preferred embodiment the sheet material is selected from sterilizable material, i.e. material which allows sterilization of the filtration module without affecting the characteristics of the module.

It has been explained before that the inventive module may be produced of the sheet material without having a support member for the numerous layers of sheet material.

According to a further aspect of the present invention, however, it may be advantageous to have a hollow support member supporting the inner peripheral surface of the body for specific filtration applications. In such cases the hollow support member preferably defines the passage of the body.

Such hollow support member may be made, for example, from organic synthetic polymer material, which is inert with respect to the fluid to be processed. Examples for such polymeric material, which is preferably used to produce the hollow support member, are polyethylene, polypropylene, polyamide, partly or wholly fluorinated hydrocarbon resins etc.

In a preferred embodiment, the hollow support member is a hollow shaft, the wall of the shaft being perforated in order to provide access for the open ends of the channels opening to the inner peripheral surface of the body to the passage.

According to yet another aspect of the present invention, the inventive module is manufactured from a sheet material which has areas at the edge of the openings forming the inlet channels, the thickness of which being smaller than the thickness of the sheet material remote from those openings.

Such structure of the sheet material in the vicinity of the openings forming the inlet channels further increases the surface area on the inlet channel side, a means which further enhances the filtration capacity of the module thereby increasing the service life of the module in applications involving filtration.

The areas of sheet material of smaller thickness at the edge of the openings forming the inlet channels preferably are deformed, more specifically compressed to a predefined thickness.

While in principle various operations could be used in order to reduce the thickness of the sheet material at the edge of the openings forming the inlet channels, e.g., by machining operations, deforming the material or compression of the material to a predefined thickness is preferred. This is especially true when a sheet material is used which is compressible itself.

Preferably, the areas of smaller thickness of the sheet material extend in the direction to openings forming outlet channels. Of course the extension in that direction is only such that processing of the fluid is not negatively affected. In doing so it provides a means to optimize the length of the migration path for the fluid from the inlet area of the module through the body of sheet material to the closest third channel and from the third channel finally to an outlet channel.

In a further preferred embodiment of the present invention, the areas of smaller thickness extend in the direction of adjacent openings of the same kind, the areas such forming one or more continuous flow paths extending along the winding direction of the sheet material.

Such embodiment provides for an optimum of inlet channel surface area and an optimum of service life for the module in applications involving filtration.

An increased surface area on the inlet side of the module may be provided by co-winding a strip-like element of a macro-porous material which provides for a defined and pressure resistant structure for the module and may in addition serve to reinforce the body of the module. Therefore, such type of module may also be used in heavy duty applications. Further details with respect to the use of the strip-like elements are discussed below in connection with the description of the inventive process.

While the macro-porous material as an additional material co-wound with the sheet material results in a compression of the sheet material in the area of the openings forming the inlet channels already, it is preferred that the macro-porous material is at least less compressible than the sheet material in order to make sure that the macro-porous structure of the strip-like element is maintained in the finished module. More preferably, the macro-porous material is essentially incompressible. Essentially incompressible means that the macro-porous material essentially does not change its macro-porous structure upon the application of the compression forces needed to manufacture the module.

In order to make maximum use of the increased surface area on the one hand and in order not to disturb the overall structure of the module on the other hand, it is preferred that the strip-like element has tapering edges or edges with a wedge-shaped cross-section.

In such a configuration the compression of the sheet material is maximal in the area of the openings forming inlet channels, whereas the compression gradually is reduced in the direction extending from these openings in the direction to the outlet channels.

This allows for a smooth building-in of the strip-like element into the module which at the same time provides for additional security with respect to avoidance of bypasses between adjacent layers of sheet material.

In order to provide further security with respect to the bypass problem, a second strip-like element may be co-wound with a sheet material to cover the areas of the sheet material comprising the openings forming the outlet channels. The second strip-like element may be used together with the first strip-like element or independent of the same. The second strip-like element provides for a compression of the sheet material in the area of the outlet channels serving for an intimate contact of the sheet material around the openings forming the outlet channels which provides for additional safety against unwanted bypasses.

Preferably, the second strip-like element has openings to essentially register with the openings of the sheet material.

The material from which the second strip-like element is made, may be the same as the sheet material, since the material from which the second strip-like element is made need not necessarily be incompressible. The main function of the second strip-like element is to provide additional compression forces in the areas of the outlet channels so as to provide further security against bypasses.

The second strip-like element therefore may be made of a depth filter material, but may also be in some applications made of an essentially non-porous material. In addition, the second strip-like element may be made of a material which is essentially incompressible.

As is the case for the first strip-like element, the second strip-like element may also preferably have the form of a band having tapering or wedge-shaped cross sectioned edges. As with the first strip-like element, also here the wedge-shaped cross section allows for a smooth co-winding of the second strip-like element with the sheet material. Also the compression exerted by the wedge-shaped strip-like element is maximal at the edges of the openings forming the outlet channels and is gradually reduced in the direction of the edges of said band.

For quite a number of applications in the field of biopharmaceuticals and others, e.g., prefiltration and fine filtration in enzyme production processes, there arises the need to enhance and/or adapt the filter performance to specific needs which often may be served by adding a filter aid, usually in the form of a powder or slurry, to the inlet flow. The filter aid changes the character of the resulting mass of solids collected on the surface and within the structure of the filter material in a manner which enhances the filtration characteristics of the filter. When this enhancement is accomplished by adding the filter aid to the process fluid to be treated, it is called a body feed process. When the enhancement is accomplished by adding the filter aid to a fluid that is conducted through the filter before the process fluid is introduced, it is called a precoat process. A precoat process may be conducted prior to filtering a process fluid using a body feed process and the fluid used for a precoat process may be different from or the same as the process fluid.

Therefore, according to another aspect of the present invention, the inventive module comprises at least one type of channels, where the channel surface supports a precoat, preferably in the form of a porous, essentially continuous layer. Most often such type of channels will be the inlet channels.

Such precoating of the inlet surface can be provided in addition to the incorporation of treatment material into the third type of channels and/or incorporating additives into the sheet material.

If there is a continuous flow path created by areas of reduced thickness or more specifically by compressed areas at the edge of the openings, such flow paths preferably also have a surface supporting a precoat.

If a macro-porous strip-like element is used to provide for the areas of smaller thickness, the surface provided by the macro-porous strip-like element also preferably supports a precoat which may be in the form of an essentially continuous porous layer of precoat material.

In a further preferred embodiment, the precoat comprises two or more components. This provides for further possibilities to adapt the properties of said material to specific tasks.

Preferably at least one of the components of the material is in particulate form.

For specific applications, the precoat comprises a porous particulate component. The porous particulate component may serve specific purposes to treat the fluid to be filtered and/or capture specific components of the non-filtrate.

Likewise the precoat may comprise a filter aid as a component in specific applications.

In another embodiment, the precoat may comprise a treatment agent and/or a reactive agent as a component.

In still another embodiment, the precoat may comprise an absorptive or adsorptive agent as a component.

Examples for the afore-mentioned components for the precoat are the following:

Kieselguhr, perlite, bentonite, activated carbon, zeolite, micro-crystalline cellulose and PVPP.

The aspects to select a specific component for the porous layer can be essentially the same as previously discussed in connection with the selection of additives for the sheet material.

The above described filter modules offer a versatile means to accommodate a large number of specific needs, especially in the area of biopharmaceutical filtration processes or the fine filtration in enzyme production processes.

The deposition of a precoat, especially as a continuous layer of porous material, on the surface of at least one type of the channels of the body provides an inexpensive means to further enhance the filtration performance.

According to a further aspect of the present invention the module preferably comprises two end pieces to be sealingly positioned with a front face against the opposite ends of the passage in said body in order to accommodate the body of the filter module in filter housings or other pre-existing environments. At least one of the end pieces comprises an opening to provide access to said passage.

The front faces of the end pieces may contain sealing elements in order to sealingly engage the opposite ends of the passage of said body. If the module is provided with a hollow support member, the end pieces may cooperate with the end faces of said support member.

Furthermore preferred is to have end pieces which comprise sealing flanges protruding from said front faces, said flanges being designed to contact and optionally also compress at least the innermost layer of the sheet material thereby providing a sealing element free seal between the body and the end pieces.

Said end pieces preferably additionally comprise a support flange protruding from the front faces and mating with the inner peripheral surface of the body or the hollow support member. This embodiment is especially designed to cooperate with the body of the module when a compressible sheet material is used. In such a case, the flanges may have a wedge-shaped cross section and penetrate at least partly the edges of the sheet material so as to compress the same providing for a more dense structure of the sheet material which enhances the sealing effect.

In further preferred embodiments, the protruding flanges designed to contact and compress two or more of the innermost layers of sheet material of said body and the protruding flange may have a double wedge-shaped structure of two concentrical wedge-shaped rings contacting two or more innermost layers of sheet material of said body.

In case a support member is used to support the inner peripheral surface of the body, it is preferred that the hollow support member has radially extending annular protrusions in its portions adjacent to the ends of the body so as to provide a form fit with the compressible sheet material, avoiding slippage of the sheet material when the end pieces are sealingly engaging the ends of the body.

As explained earlier on, it is advantageous when the module is compressed such that the body of wound layers constitutes a depth filter unit, once the sheet material is made of a depth filter material.

According to yet another aspect of the present invention clamping means are positioned on the outer peripheral surface of the body in order to maintain the compressed state of the sheet material of the module body.

The clamping means may directly act on the outer peripheral surface of the body and preferably acts on those areas of the body comprising outlet channels. This measure provides for additional safety against bypass risks.

In another preferred embodiment, the clamping means directly act on the outer peripheral surface of all areas of the body except those comprising the inlet channels. This provides a maximum of safety against bypass problems as outlined before.

In another embodiment, the areas of the body comprising outlet channels are compressed to a greater extent than those areas comprising inlet channels. This provides for maximum flexibility to enhance the surface area on the inlet side of the filter module and provides maximum safety against bypass problems likewise.

In a further preferred embodiment the clamping means comprise a sheet like material including apertures to match the openings of the outermost layer of sheet material, contributing to form inlet channels.

Furthermore preferable clamping means show a shrinkage characteristic such as to at least match the shrinkage characteristic of the body of sheet material under sterilization conditions. Such a feature ensures that the compression of the body of sheet material is maintained even if the inventive module has to undergo a sterilization process.

An example for a clamping means is a mesh type material or a perforated film material.

Organic synthetic film material, e.g. shrink film, may be easily used as a clamping means.

Alternatively, strip-like material may be used to maintain the body of sheet material in a compressed state.

In such case, preferably the openings of the different types of channels are arranged in different rows in the sheet material so as to provide disk like areas of the body, where outlet channels are arranged, such areas not comprising openings forming inlet channels.

In such an embodiment the strips are preferably positioned on the outer periphery of the disk like areas of the body comprising the outlet channels.

In order to make maximum use in such a configuration of the sheet material forming the body of the filter module, it is preferable that the body comprises in the vicinity of and spaced apart from its both end faces third type channels. This provides for further capacity in that the end faces of the filter module may be left open and in communication with the inlet side of the filter module, such faces also contributing to the inlet surface area of the module.

It has been found out that strip-like or sheet like material made of a polymeric material may often have favorable properties with respect to shrinkage when it is used together with cellulosic type sheet material forming the body, since the shrinkage effects observed with both type of material upon sterilization are similar.

While one or more layers of the body may be formed by individual portions of sheet material it is preferred that several if not all of the layers are formed of a continuous strip of sheet material spirally wound to form the body of the module.

According to a further aspect of the present invention the sheet material constituting the body of the filter module preferably consists of a unitary tape, i.e. one piece of tape only, having a first and a second end portion, the first end portion being positioned and forming the inner peripheral surface and the second end portion forming the outer peripheral surface of the body of the filter module. Preferably at least one of those first and second end portions of the tape has a smaller thickness than those portions of the tape between those two end portions.

If the first end portion forming the inner peripheral surface, or at least part of it, has a smaller thickness than those portions of the tape between the two end portions, a smooth winding is ensured starting from the innermost portion of the body of the module.

If the second end portion has a smaller thickness than those portions of the tape between those two end portions, especially the clamping means are tightly abutting the outer peripheral surface of the body also in the area, where the second end portion of the tape of sheet material ends.

Preferably, there is no stepwise configuration present at the second end portion of the sheet material.

In order to provide a very smooth transition, the first and/or second end portions of the tape have a tapering cross section in the lengthwise direction of the tape. Thereby a very smooth transition of the first and/or last winding may be obtained.

The present invention furthermore relates to a process for the manufacture of the filter module as outlined above and such process comprises:
winding the sheet material around a support element to form a body of a multiplicity of consecutive layers with an inner peripheral surface and an outer peripheral surface, the sheet material being compressed by a compression force when wound around the winding axis to provide intimate contact of each of the layers to the adjacent layer(s), said compression force being applied in a radial direction by a roller.

It is important according to the process of the present invention to apply the compression force in a radial direction by way of a roller, co-rotating with the body of sheet material during the winding process. Then not only a carefully controlled compression force may be applied, but also the sheet material is treated very carefully, and sheet material may be used which does not need to have high tensile strength, since the compression force is separately applied and need not be created by tensile forces exerted on the sheet material.

It has been found that a compression of the sheet material, such that the thickness of the compiled layers of the body amounts to about 99% or less of the thickness of the same number of individual layers of sheet material is often already enough to solve the bypass problem. As explained in detail above, the amount of compression needed is of course depending on the compressibility of the sheet material itself so that with easily compressible sheet material a more pronounced compression of the body may be advantageous.

However, usually the thickness of the compiled layers of the compressed body will amount to about 20% or more of the thickness of the same number of individual layers of sheet material. If the compression is higher than that limit, there might result an undesirable high reduction in the dirt retention capacity. On the other hand, a high compression improves the filtration efficiency for smaller particles. Therefore, the modification of the compression force exerted by the roller is a means to adapt the filtration characteristics of a given sheet material to specific filtration applications.

A further preferred limit to compress the body corresponds to about 50% or more of the thickness of the compiled individual layers of sheet material. A compression within this limit is easier to be handled with respect to the processing characteristics to be achieved.

Nevertheless, often enough with compressible sheet material compression to a thickness of about 85% or more of the compiled individual layers will provide very good results. In a large number of cases, the compression preferably amounts to a thickness of the compiled individual layers of about 97 to about 85%.

According to another aspect of the present invention the process comprises forming of the openings in the sheet material and reducing the thickness of the sheet material to a predetermined value in areas where openings are provided for forming inlet channels.

Reducing the thickness of the sheet material can be achieved in different ways.

In some cases it is preferable to carry out the thickness reducing prior to forming the openings. Depending on the nature of the sheet material forming of the openings may be facilitated.

With some sheet materials the thickness reducing can be carried out after forming the openings.

In many cases the thickness reducing can be carried out simultaneously with the formation of the openings. Especially preferred is the use of a punching tool to form the openings, the punching tool being provided with compression elements for compressing the sheet material in the areas of openings for forming the inlet channels.

As a further alternative the thickness reducing can be carried out while winding the sheet material to form said body.

As an alternative to deformation or compression of the sheet material prior to winding the same to form the body of the module, a first strip-like element of a macro-porous material may be co-wound with the sheet material to cover the areas of the sheet material comprising the openings forming inlet channels. By co-winding the macro-porous material in strip-like form, automatically a compression of the sheet material in the area comprising the openings forming inlet channels is achieved and due to the macro-porous character of the material, the surface area of the sheet material is still accessible to the fluid to be processed without hindering the fluid essentially to contact the sheet material surface on the inlet side of the filter module. Optionally, the strip-like element may comprise openings essentially matching the openings of the sheet material.

The term macro-porous as used in this context means any three-dimensional open-pored structure which does not contribute noticeably to a filtering effect and which preferably essentially presents no flow restriction to the fluid in the inlet channels.

Preferably said macro-porous element comprises openings essentially registering with the openings forming the inlet channels. In this case the macro-porous element adds as little as possible to pressure drop and does not disturb fluid flow to the inlet channels.

Most preferably the thickness reducing comprises reducing the thickness of the sheet material from both sides of the sheet material. Thereby formation of ring shaped channel structures interconnecting a plurality of inlet channels is greatly supported.

In order to provide further security with respect to the bypass problem, a second strip-like element may be co-wound with a sheet material to cover the areas of the sheet material comprising the openings forming the outlet channels. The second strip-like element may be used together with the first strip-like element or independent of the same. The second strip-like element provides for a compression of the sheet material in the area of the outlet channels serving for an intimate contact of the sheet material around the openings forming the outlet channels which provides for additional safety against unwanted bypasses.

The material from which the second strip-like element is made, may be the same as the sheet material, since the material from which the second strip-like element is made need not necessarily be incompressible as the main function of the second strip-like element is to provide additional compression forces in the areas of the outlet channels so as to provide further security against bypasses.

The second strip-like element therefore may be made of a depth filter material, but may also be in some applications made of an essentially non-porous material. In addition, the second strip-like element may be made of a material which is essentially incompressible.

In case that the channels of the third type are to hold a particulate treatment material, such treatment material may be fed into these channels once the winding operation has built up the channels in radial direction to their essentially full extent and the windings to follow are to seal off the radially outwardly oriented ends of the channels of the third type. Then, a filling die may be positioned on part of the surface of the body of wound layers, having one or more orifices directed to the positions of the channels of the third type and connected to a filling hose. The filling die may extend over the whole axial length of the module and have orifices for feeding each ring shaped portion of the body of the module which accommodates channels of the third type or it may have only one or several orifices which is then positioned at the various portions of the body to feed the particulate matter into the various channels of the third type in subsequent steps. Once the filling has been terminated, the channels of the third type are covered by sheet material which does not include any more openings in the area where the channels of the third type are accommodated so as to seal off these channels of the third type to the exterior of the body.

Of course as mentioned above, channels of the third type may be filled with different types of particulate matters and then of course a more complicated filling die is needed to fill the various channels of the third type with different particulate materials.

During the filling of the channels of the third type, the body of wound layers may be rotated so that with one filling position of the filling die, all of the various channels of the third type may be filled with particulate material.

The above described and further advantages of the present invention will be apparent from the following description of the figures of the drawing.

BRIEF DESCRIPTION OF THE DRAWINGS

FIG. 9: a schematic cross-sectional representation of an apparatus for manufacturing a module of the present invention.

DETAILED DESCRIPTION OF THE INVENTION

Figure 1:
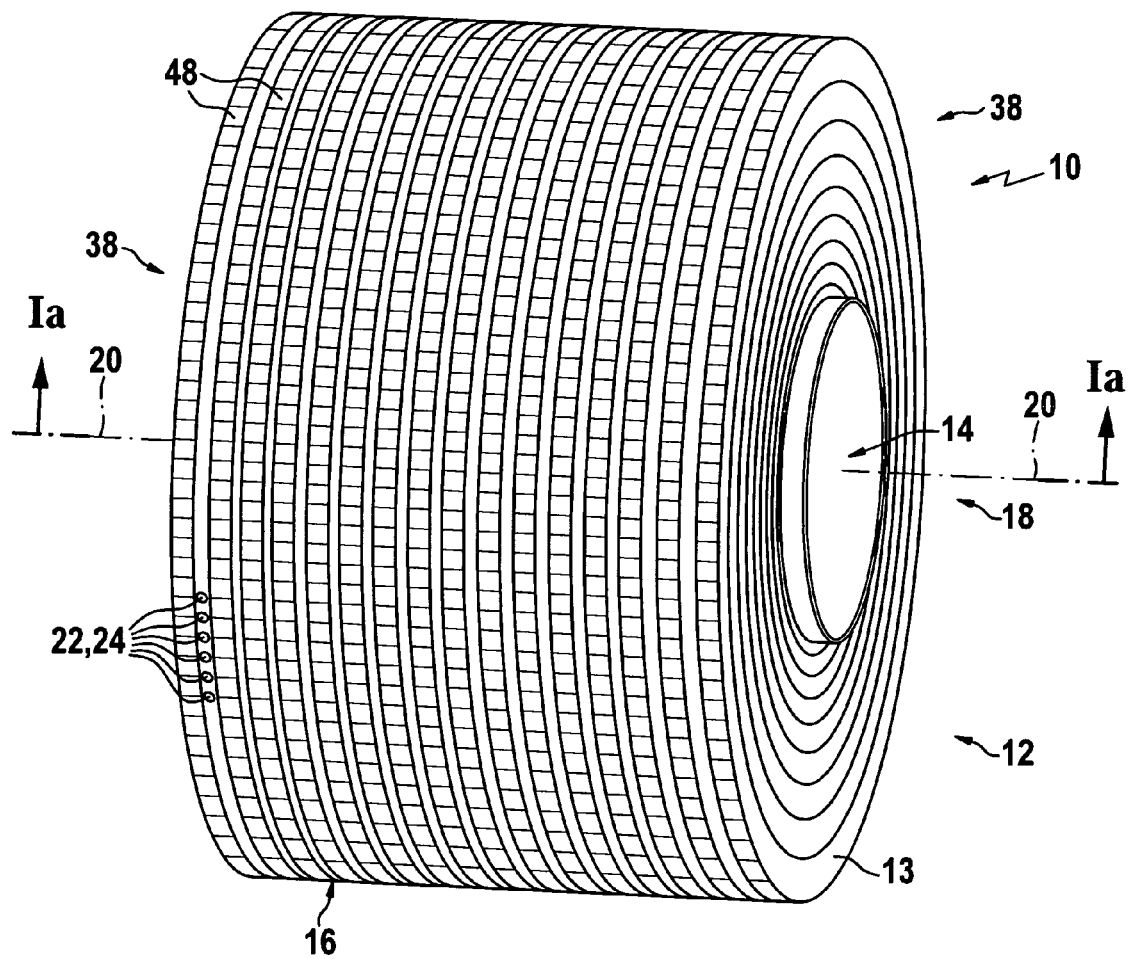
FIG. 1: A first embodiment of an inventive module with a body of wound layers of sheet material.

FIG. 1 shows a module 10 of the present invention, comprising a body 12 of wound layers of a sheet material 13.

The body 12 of module 10 comprises an inner peripheral surface 14 and an outer peripheral surface 16. Within the body 12 there is a passage 18 which extends through the body 12 along its winding axis 20, coextensive with the inner peripheral surface of the body. The inner peripheral surface of the body is in fluid communication with the passage which is constituted in the embodiment of FIG. 1 by a support member in the form of a hollow, perforated shaft (not shown in FIG. 1).

The sheet material 13 comprises a large number of openings 22 which in case of the embodiment shown in FIG. 1 are of circular shape, cooperating to form a first type of channel 24 which opens to the outer peripheral surface 16. Channels 24 generally extend in the direction from the outer to the inner peripheral surface of the body 12.

Figure 1A:
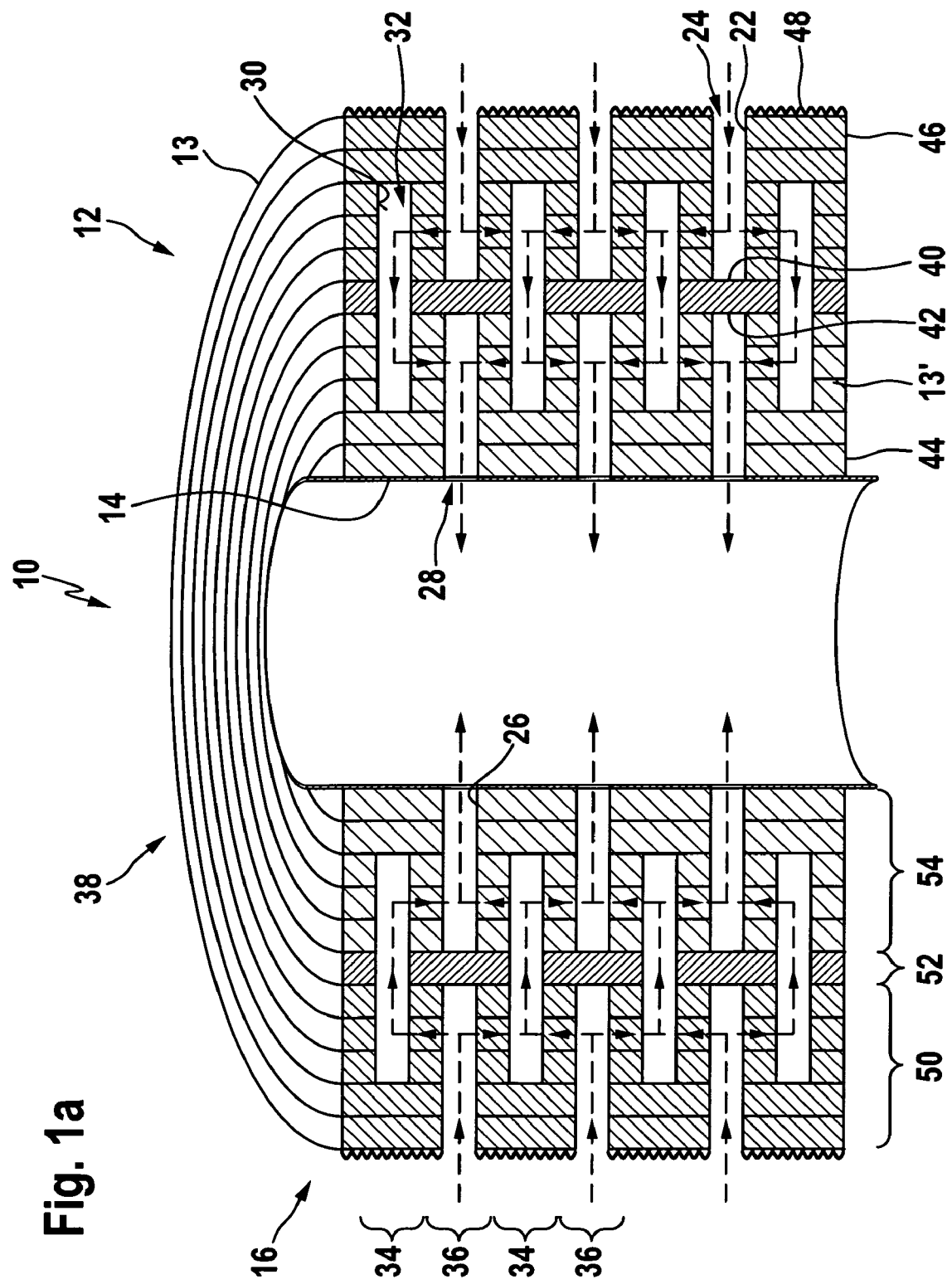
FIG. 1a: the module of FIG. 1 in a cross-sectional representation along line Ia-Ia.

The sheet material 13 furthermore comprises a plurality of openings 26, cooperating to form a second type of channels 28 which open to the inner peripheral surface 14 of the body 12 (cf. FIG. 1a). Channels 28 generally extend in the direction from the inner to the outer peripheral surface of body 12.

A third type of channels 32 is provided by registering openings 30 (cf. FIG. 1a). The channels 32 extend in radial directions of body 12 and are closed at both ends thereof. The third type of channels 32 will in numerous applications hold a particulate treatment material, but in other cases just receive the fluid from the inlet channels, allow the fluid to redistribute and pass on to the outlet channels.

For ease of reference, the first type of channels 24 will be called inlet channels, the second type of channels 28 will be called outlet channels. The third type of channels 32 will be called treatment channels.

It has, however, to be noted that this is within the scope of the present invention that the channels 24 which open to the outer peripheral surface 16 may function as outlet channels, whereas the channels 28 which open to the inner peripheral surface 14 than serve as inlet channels. The fluid flow would then be reversed from passage 18 into channels 28, through the body 12 of sheet material 13 to the channels 32 and from there to the outlet channels 24 collecting the filtrate and draining it to the outer peripheral surface 16. Also the treatment channels 30 may not necessarily hold any treatment material as noted above.

Preferably, the openings 22, 26 and 30 are arranged in the sheet material 13 in parallel rows so that the inlet and outlet channels 24 and 28, and the treatment channels 32, respectively, are formed in separate disk shaped portions 36 and 34 of the body 12.

On both of its end faces 38, the body of filter module 10 is supported by end pieces 150 (cf. FIG. 1, not shown in FIG. 1a).

The inlet channels 24 are closed on their ends 40, located towards the inner peripheral surface 14 of body 12 and not in communication with said passage 18. Correspondingly, the outlet channels 28 are open at their ends adjacent to the inner peripheral surface 14, but are closed at their opposite ends 42 towards the outer peripheral surface 16. The third type of channels 32 is closed at both ends thereof. In order to provide this structure of channels 24, 28 and 32 in the body 12 of the filter module 10, the sheet material 13 comprises in a first end portion 44 openings 26 only which contribute to forming the outlet channels 28. No openings which could contribute to forming treatment channels 32 are found in that portion 44 of sheet material 13.

At its other end portion 46, the sheet material 13 comprises only openings 22 contributing to form inlet channels 24, and in that end portion 40 no openings 30 are found which contribute to forming treatment channels 32.

Usually, the length of the end portions 44 and 46 are such that the closed ends of the treatment channels are covered and shut off by at least two consecutive layers of sheet material 13 within the body 12 adjacent to the inner peripheral surface 14 and the outer peripheral surface 16, respectively.

This is usually enough to ensure that the fluid flow characteristic of the body 12 as a whole is maintained and no fluid to be treated may bypass the sheet material and find a shortcut from the inlet of the module 10 to the outlet of the module.

In case of the specific embodiment shown in FIG. 1a, the body of windings of sheet material is roughly divided in three portions 50, 52 and 54. The outer cylindrical portion 50 of body 12 is made of one first sheet material 13 and accommodates the inlet channels 24. The innermost cylindrical portion 54 of body 12 accommodates the outlet channels 28.

In between these two cylindrical portions, there is one third portion 52 which is an intermediate portion to separate the two portions 50 and 54 of body 12 accommodating the inlet and outlet channels. The sheet material making up for the third portion 52 has only openings 30 but no openings to contribute to outlet channels 24, 28. This portion of sheet material may be comprised of a fluid impervious material. In this case one layer (winding) will be sufficient.

In the alternative, the cylindrical portion 52 may be constituted of several layers of a filter of the second filter material which also makes up for the portion 54 of the body 12. The number of layers required in portion 52 is dependent on the fluid flow resistance it provides to the fluid in radial direction of the body 12 which must be such that no direct flow from the inlet channels 24 to the outlet channels 28 may occur.

In a preferred embodiment as shown in FIG. 1a, the inner cylindrical portion 54 (optionally also the intermediate portion 52) of body 12 is made of a sheet material which has a different filter characteristic from the sheet material 13 used for manufacturing the outer cylindrical portion 50 of body 12. Such a configuration may be used to provide a two step filtration in one module, whereas a prefiltration is provided by the sheet material 13 of the outer cylindrical portion 50 of body 12 and the fluid filtered by the sheet material 13 and collected in the treatment channels 32 is then filtered in a second step through the sheet material 13' and collected in the outlet channels 28 from where it flows to the passage 18.

By providing the inlet channels 24 and the outlet channels 26 in the same disk shaped portions of the body 12, a very much compact structure of the module is made possible.

It goes without saying that the treatment channels 32 may be filled with treatment material as will be discussed in some more detail below.

In case the treatment channels 32 are filled with a treatment material, three different processes may be performed upon one passing of the fluid through module 12, namely
a prefiltration in the course of passing the fluid from the inlet channels 24 to the treatment channels 32,
a treatment of the fluid when passing through the treatment channels 32 and
a second filtration step when passing the fluid from the treatment channels 32 to the outlet channels 28.

Figure 4:
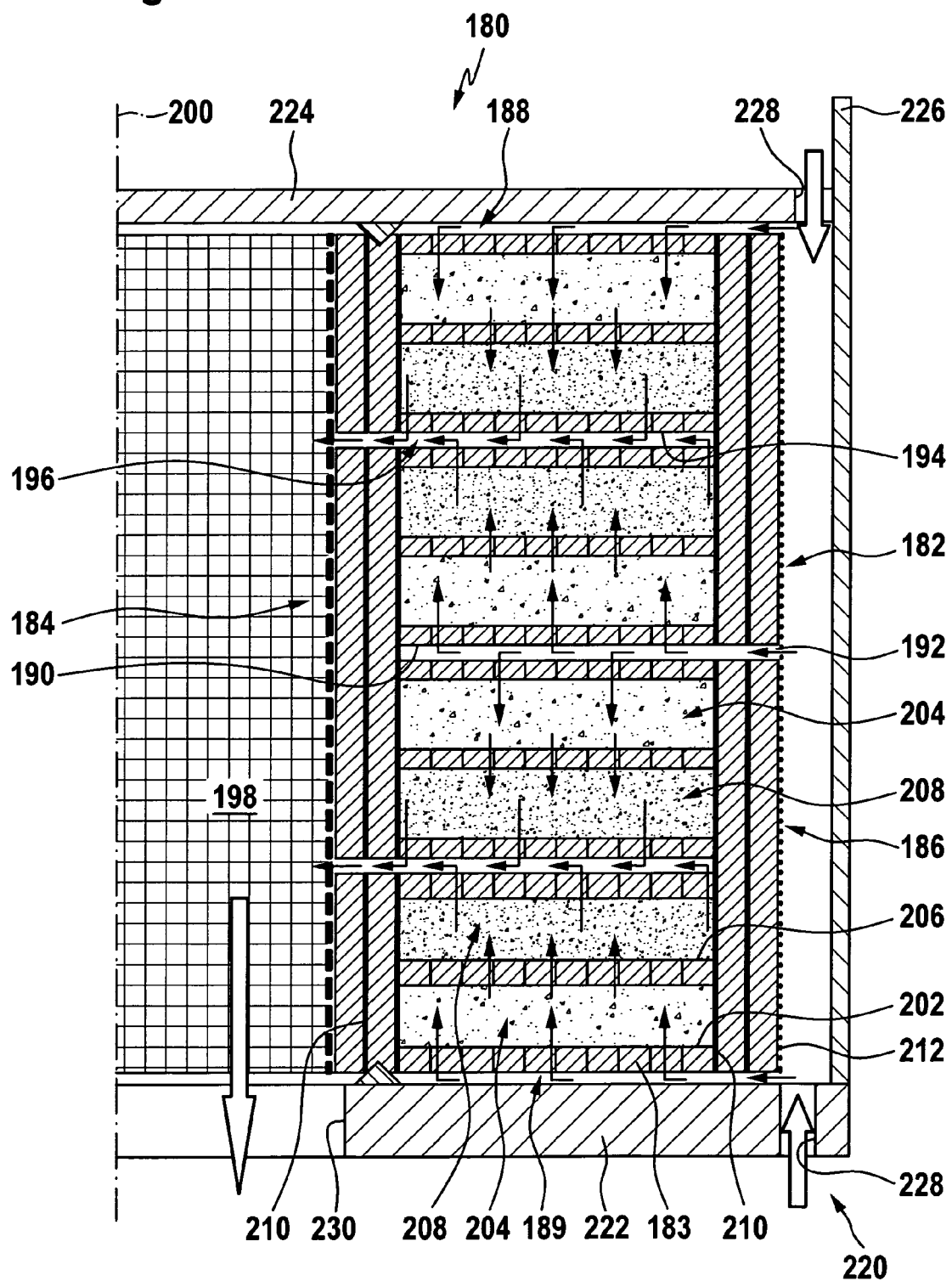
FIG. 4: a partial cross-sectional representation of a module according to a fourth embodiment of the present invention.

It is readily understood from this explanation that if further treatment channels 32 would have been provided and the outlet channels 28 would have been arranged in a section of the module which is different from the section accommodating the inlet channels even more steps could be performed in one pass of the fluid through module 10 (cf. description of FIG. 4).

By having the end portions 44 and 46 provided with tapered sections (not shown), a smooth winding of the sheet material 13 is provided which contributes to a full contact of adjacent layers of sheet material 13 throughout the body 12.

The tapered portion of end portion 46 of the sheet material 13 at the outer peripheral surface 16 of body 12 provides for a smooth outer surface 16, avoiding step-like recesses on that surface.

This is of importance, once the body 12 of the filter module 10 is hold in compression by strip-like elements 48 which serve to keep the sheet material 13 of body 12, and therefore the body 12 as a whole, in a compressed state such that bypasses from inlet channels 24 to treatment and outlet channels 28 are avoided.

The strip-like elements 48 function as compression means and are positioned on the outer peripheral surface 16 of body 12 on such disk shaped portions 34 of the body 12 which comprise the treatment channels 32. The portion 36 of the body 12 comprising the inlet and outlet channels 24 and 28 are not covered by these strip-like elements 48. Therefore the compression of the body 12 in the areas 34 comprising the treatment channels 32 is somewhat higher than in the portions 36 of body 12 accommodating the inlet and outlet channels 24.

The tapered end portion of the end portion 46 of the sheet material 13 helps to apply the compression force of the strip-like elements 48 around the whole outer peripheral surface 16 in an even fashion which makes sure that the body 12 has homogenous filter characteristics throughout the whole body.

The sheet material 13 (and optionally 13') of body 12 may be a depth filter material or may be a non-porous material depending on whether the module is to work as a depth filter unit or a surface filter unit or a treatment module.

Most of the depth filter materials useful in the present invention may be compressed or deformed. The portion of deformation, which is permanent, differs depending on the depth filter material used.

Preferably, the depth filter material is not only plastically or permanent deformable, but at least partly shows elastic properties so that upon compression of the sheet material 13 (13'), the elastic portion of the deformation helps to keep the adjacent layers of sheet material 13 (13') in close contact with one another, although the surface of the sheet material 13 (13') may in its original state not be perfectly planar.

The preferable depth filter material used according to the present invention may have different basic structures. For example, nonwoven fiber material may be used on the basis of melt blown fibers, cellulosic fibers or other naturally occurring fibers, organic or inorganic fibers, metal fibers, glass fibers, ceramic fibers, etc.

Also woven materials are possible with various fiber structures. The woven material may be monofil material, multifil material and/or multilayer material The basic materials may be cellulosic material, or other naturally occurring fibers, organic or inorganic fibers, the latter including metal fibers.

Also sintered materials may be a suitable depth filter material for use as sheet material including sintered woven materials, sintered powder materials of different structure and particle sizes, mainly made of plastic or metal.

Furthermore, foamed material of plastic or naturally occurring polymers of different structure may constitute a sheet material useful in the present invention.

Depth filter materials manufactured of the basis of cellulosic fibers may be compressed substantially, i.e., very well below about 20% of their original thickness without destroying integrity of the filter layers. The degree of maximal compression of course depends on the presence or absence of additives combined with the cellulosic fibers. Such additives may very well be incompressible and may occur in amounts of up to about 70% by weight, based on the weight of the sheet material.

Cellulose based sheet materials are well suited for the present invention. They may be compressed to a thickness of, e.g., about 12% of the original thickness, using a compression force of 2700 N. When those materials are allowed to recover a thickness of about 20% of the original thickness, the elastic force amounts, e.g., to 530 N.

Other examples of useful cellulose based sheet materials, which may be used according to the present invention as sheet material to form the body 12 may be compressed to a thickness of about 33% with a compression force of 3600 N and show a elastic force when released to a thickness of about 45% of its original thickness of 250 N.

Cellulosic material usually swells when contacted with aqueous media and in the latter example, the elastic force may be increased by the swelling effect to 310 N.

In an application where the sheet material forming body 12 will not swell in contact with the fluid to be filtered, a somewhat higher compression will usually be used than in cases where the sheet material swells when in contact with the fluid to be filtered. This is often sufficient to ensure a safe operation of the filter module 10.

Figure 2:
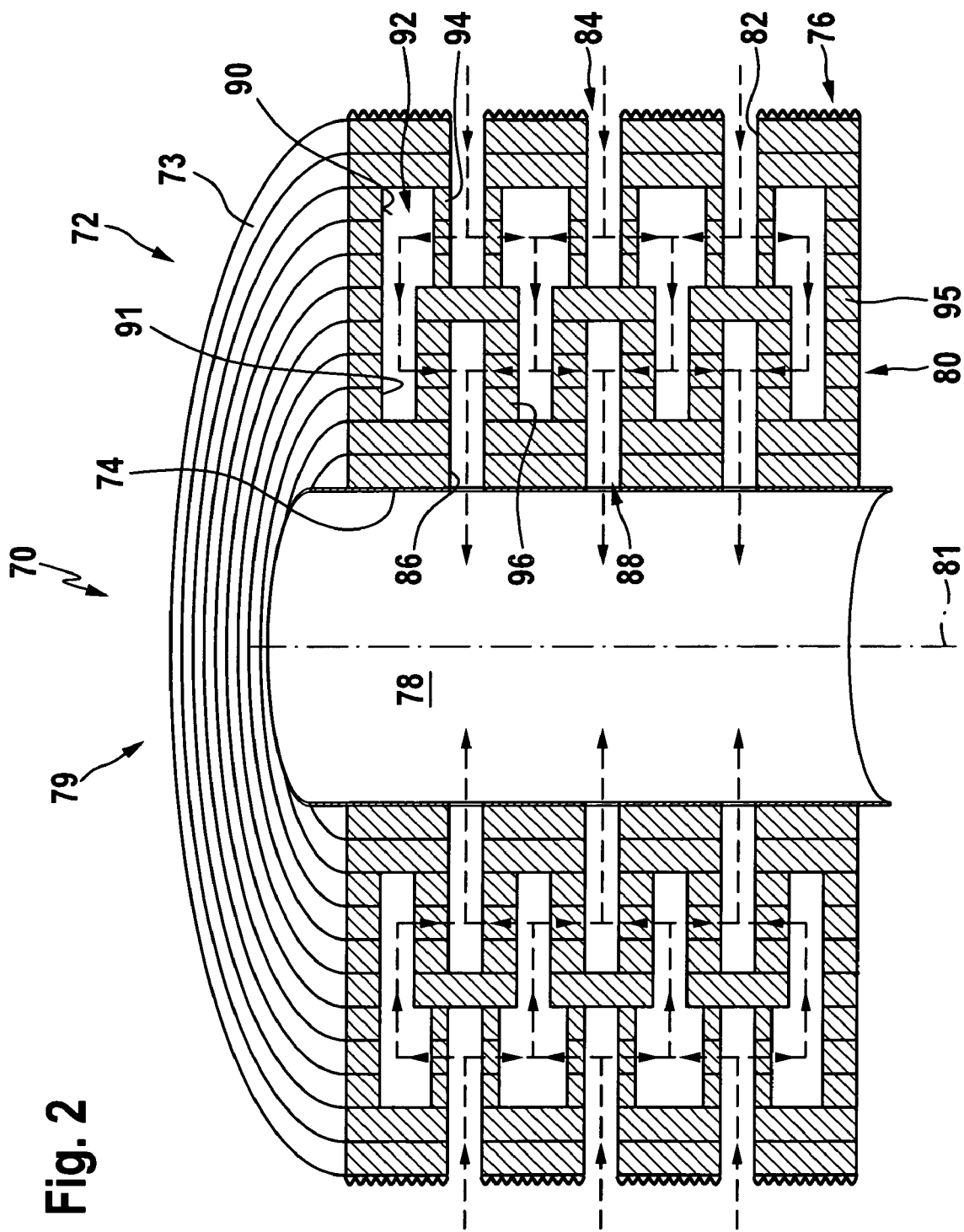
FIG. 2: a cross-sectional representation of a module according to a second embodiment of the present invention.

FIG. 2 shows a cross section through another embodiment of a module according to the present invention which is denoted with reference numeral 70. This filter module 70 comprises a body 72 of a sheet material 73 which is spirally wound to form body 72.

The body 72 comprises an inner peripheral surface 74 and an outer peripheral surface 76.

A passage 78 extends from one end face 79 of the body to the other end face 80 coextensive with the winding axis 81.

The sheet material 73 comprises a first type of openings 82 forming inlet channels 84. A second type of openings 86 are forming outlet channels 88. Further openings 90, 91 form treatment channels 92.

The inlet channels 84 are open at the outer peripheral surface 76 and are closed at their opposite end towards to the inner peripheral surface 74.

The outlet channels 88 are open at the inner peripheral surface 78 and closed at their opposite end towards the outer peripheral surface 76.

The treatment channels 92 are made up of openings 90 and 91, the openings 90 being in an outer cylindrical portion of body 72 and being wider in axial direction of body 72 then the openings 91 which are located in a more inner cylindrical portion of body 72.

Nevertheless, the openings 90 and 91 register with one another to an extent to form a continuous treatment channel 92.

In the embodiment shown in FIG. 2, the sheet material 73 is the same one making up for all of the windings of body 72 and the various cylindrical portions of the body 72 accommodating the inlet channels 84 and outlet channels 86 as well as the intermediate portion separating the inlet channels from the outlet channels. The portions 94 and 96 of sheet material 73 constitute a smaller flow resistance to the fluid in axial direction than layer 95 (in radial direction) separating the inlet from the outlet channels such that the fluid flow from the inlet channels 84 is directed to the treatment channels 92 where it is collected and then passed on to the outlet channels 88. It is important for achieving such a fluid flow that the fluid flow resistance of the stays 94 and 96 (in axial direction) in combination is less than the flow resistance of the sheet material 73 in radial direction which may determined by the thickness of layer 95.

Alternatively, the sheet material 73 may be modified to have an increased fluid flow resistance in radial direction at least for the portion forming layer 95.

Figure 3:
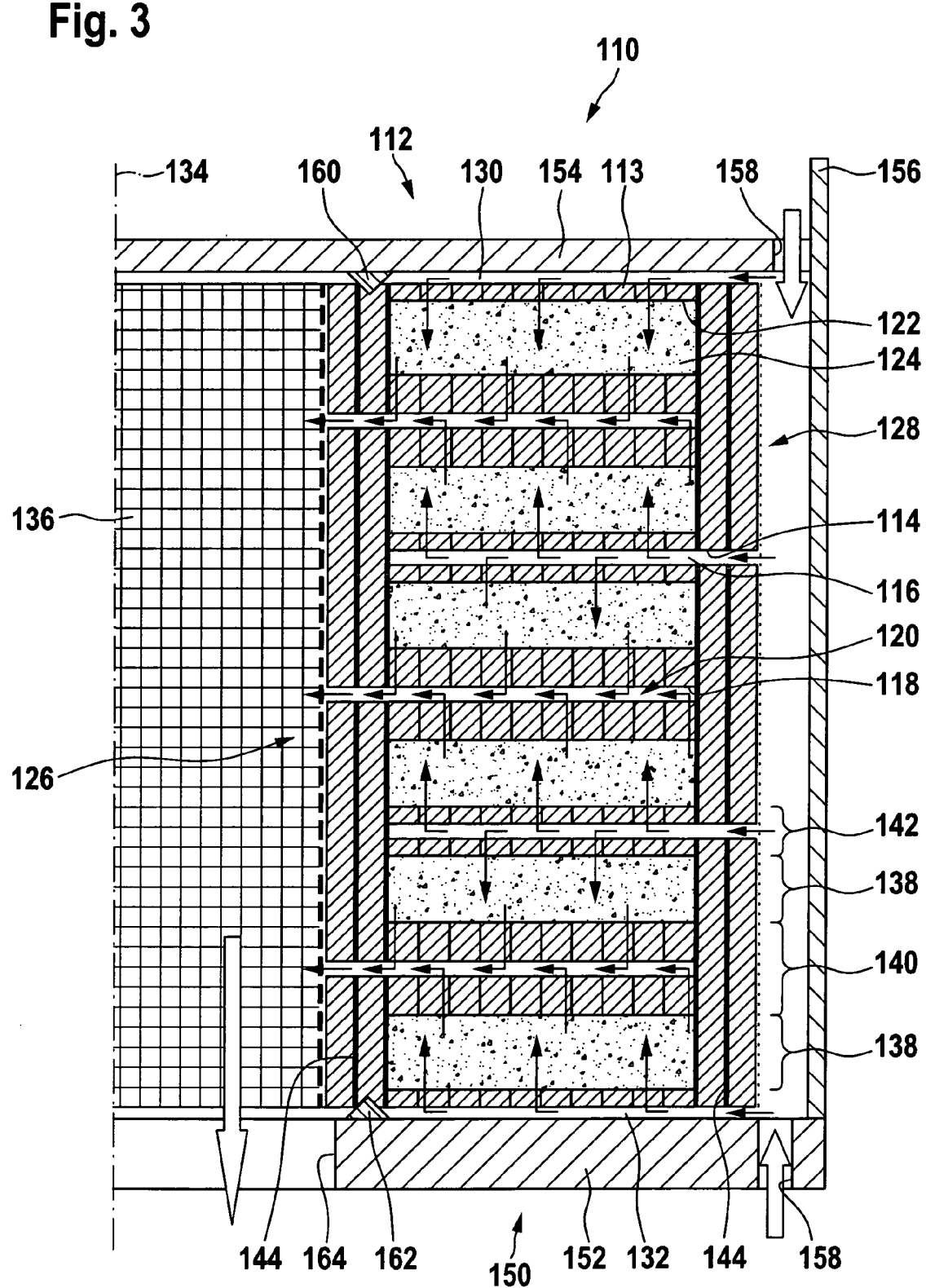
FIG. 3: a partial cross-sectional representation of a module according to a third embodiment of the present invention.

FIG. 3 shows another embodiment of the present invention in the form of a filter module 110 which is shown only with a part of its body 112.

Layers of sheet material 113 forming body 112 have opening patterns including openings 114 constituting inlet channels 116, openings 118 forming outlet channels 120 and openings 122 forming treatment channels 124.

The body 112 of winding of sheet material 113 has an inner peripheral surface 126 and an outer peripheral surface 128 and two end faces 130, 132. The windings of sheet material 113 are spirally arranged around a winding axis 134 and a passage 136.

The openings 114 are arranged in single rows, as are the openings 118 and openings 122. The cross-sectional area of the openings 122 is much larger that the cross-sectional area of the openings 114 and 118 in order to provide a large volume for the treatment channels 124.

Preferably, the shape of the openings 122 is such that they form in body 112 continuous ring shaped channels which are concentrical to the winding axis 134.

In this embodiment, each type of channels is accommodated in a separate disk shaped portion 138, 140, 142 of the body 112 spaced from one another in axial direction and therefore, each type of channels may extend essentially from the outer peripheral surface 128 of the body 112 to its inner peripheral surface 126.

Although the sheet material 113 is used to form the innermost and the outermost portion of the body 112, it may be in these innermost and outermost portions of the body 112 accompanied by an additional sheet material 144 which may serve to reinforce the body 112 and/or provide a sealing function in those portions of the body where the closed ends of any one of the channels are located.

In case of the embodiment shown in FIG. 3, the end faces 134, 136 in addition provide surface area for the non-filtrate to access the treatment channels 124.

The fluid flow in this module from the inlet side of the same follows the arrows as indicated in FIG. 3 and penetrates the sheet material 113 in axial direction of the end faces 130 and 132 as well as of the inner portions of the body 112 in the surface areas provided by the inlet channels 116.

The portions of sheet material delimiting the treatment channels 124 versus the inlet side, i.e., in direction to the end faces 130, 132 and the inlet channels 116, respectively, are relatively narrow, whereas the portions of sheet material delimiting the treatment channels 124 on their downstream side versus the outlet channels 120 which are wider in the axial direction of body 112.

In such an embodiment, the sheet material 113 provides only for a sort of preliminary filtering effect for the fluid to be treated prior to the fluid entering the treatment channels 124. However, on the downstream side of the treatment channels 124 a more wider portion of sheet material 113 provides for a further filtering effect for the fluid prior to have it pass on to the outlet channels 120.

The treatment channels 124 may be filled with particulate material providing for a treatment of the fluid according to a specific processing application. Examples for such a particulate matter have been given in connection with the foregoing description of other embodiments of the present invention already.

In addition, FIG. 3 shows one module 110 incorporated in a housing 150 which comprises a bottom plate 152, a top plate 154 as well as a cylindrical wall 156 interconnecting top and bottom plates 152 and 154.

The top and bottom plates 152 and 154 may have feed openings 158 which may be positioned as shown in FIG. 3, e.g., at their outer circumferential portions of the bottom and top plates 152, 154. The openings 158 allow inflow of non-filtrate into the housing 150 and access the end faces 130 and 132 as well as the inlet channels 116.

It is easily understood that the openings 158 need only be provided at one of the top and bottom plates 152, 154, respectively, or may be provided in the cylindrical portion 156 of housing 150.

The top and bottom plates 152 and 154 each include a projecting sealing rim 160, 162 which are positioned such that they contact and actually compress part of the sheet material 113 in the innermost cylindrical portion of body 112 in order to seal off an outer cylindrical space of housing 150 against module 110 from the innermost cylindrical volume of housing 150 accommodating the portion of the body 112 including the open ends of the outlet channels 120 as well as the passage 136 draining the outlet channels of body 112.

The bottom plate 152 has a central opening 164 in order to provide access to passage 136.

An exemplary application for which the module 110 may be used is beer filtration which will be described in the following.

The sheet material used for making the body 112 of module 110 for this application is typically a cellulosic depth filter sheet material having a filtration characteristic usual for such applications.

In a first stage a pre-filtration removes particles of a size of about 1 µm or larger. This pre-filtration occurs when the non-filtered beer passes from the volume provided between the outer surface of the module 110 and the housing 150 through the end faces 130, 132 and the adjacent portions of sheet material 113 into the treatment channels 124. Additionally beer enters the inlet channels 116, passes through adjacent portions of sheet material 113 and also accumulates in the treatment channels 124.

For the specific application of beer filtration the treatment channels 124 provide an ideal means to perform a stabilization treatment in one process step together with the filtration of the first processing stage.

To this effect the treatment channels 124 accommodate a stabilizing agent as a particulate treatment agent. The stabilizing agent may be selected for example from silica gel and PVPP or mixtures thereof. In the present example a mixture of silica gel and PVPP particles is used. Since the particle size is not critical it may vary greatly. PVPP particles may have a an average size in the range of from about 10 µm to about 200 µm, the silica gel particles may have a size in the range of from about 5 µm to about 100 µm.

Whereas the PVPP particles remove polyphenols from the pre-filtered beer, silica gel particles remove proteinaceous material. Removal of polyphenols and removal of proteinaceous material both contribute to the reduction of the chill haze phenomenon.

From the treatment channels the size of which influences the contact time with the treatment agent the stabilized beer passes through further portions of sheet material 113 before it enters the outlet channels 120 from where it is drained into passage 136. During this last stage no filtration is necessary and the portions of sheet material present between the treatment channels 124 and the outlet channels 120 just serve to retain the treatment material within the treatment channels 124.

FIG. 4 shows an embodiment which has a similar design as the embodiment shown in FIG. 3 with the additional feature that two types of treatment channels are provided which are passed by the fluid to be processed in sequence prior to have the fluid exiting into outlet channels. The structure of the module 180 shown in FIG. 4 will be now described in more detail.

Module 180 comprises a body 182 which is essentially made of a plurality of windings of a sheet material 183 providing a cylindrical structure with an inner peripheral surface 184 and an outer peripheral surface 186 as well as end faces 188, 189.

The sheet material 183 comprises openings 190 which register with corresponding openings of subsequent layers to form inlet channels 192.

The sheet material further provides openings 194 which register with corresponding openings of subsequent layers of sheet material 183 to form outlet channels 196.

Whereas the inlet channels 192 are open at their one end towards the outer peripheral surface 186, the outlet channels are open at one end towards the inner peripheral surface 184 and communicate with a passage 198 extending along a winding axis 200 from one end face 188 to the other end face 189 of the body 182.

The sheet material 183 further comprises two other types of openings 202, 206 which register with corresponding openings of subsequent winding layers of the sheet material 183 to form a first type of treatment channel 204 a second type of treatment channel 208, respectively.

While the inlet channels 192 are closed at their one end directed towards the inner peripheral surface 184 and the outlet channels 196 are closed at their one end directed to the outer peripheral surface 186, the first and second type of treatment channels 204 and 208 are closed at both ends thereof, i.e., towards the inner peripheral surface 184 and towards the outer peripheral surface 186.

Because of the arrangement in axial direction of the openings 202 and 206 side by side and the next two groups of openings 202 and 206 being separated by a line of openings 194 forming outlet channels 196 and/or openings 190 forming inlet channels 192, a flow pattern for the fluid to be treated is obtained as demonstrated by the arrows in FIG. 4. Inflowing fluid passes through a first portion of sheet material either via the end faces 188, 189 or through portions of sheet material adjacent to the surfaces of inlet channels 192 and arrive in a first treatment channel 204 where the fluid is collected and passes on through a further portion of sheet material 183 and enters a second treatment channel 208 where the fluid again is collected. From treatment channels 208 the fluid passes through an other portion of sheet material 183 and is collected in the outlet channels 196 and exits the module 180 through passage 198.

It is understood that the treatment channels 204 and 208 are separate from one another and therefore may accommodate the same or different types of treatment material or one treatment channel may be free from treatment channels, the other one may be filled with treatment material.

It is easily understood that the number of different treatment channels may be even increased to have the fluid pass through an even larger number of treatment channels until it is collected in outlet channels 196 and passed on to passage 198.

It is noted, however, that the structure provided by the module 180 represented in FIG. 4 already provides a very large versatility as to processing applications for fluids which may be even increased by a selection of various sheet material 183.

As noted above, the end portions of the treatment channels 204, 208 as well as one of the ends of inlet and outlet channels 192, 196 are closed in order to achieve the desired fluid flow pattern. In order to securely close the respective ends of the different channels 192, 196, 204 and 208 at the inner peripheral surface 184 and at the outer peripheral surface 186, two layers of sheet material are provided which lack the respective openings 190, 194, 202 and 206.

In order to further ensure that no bypasses occur and that the fluid flow pattern exactly corresponds to what is necessary for fluid processing, the windings of sheet material 183 may include in the innermost and outermost portion of body 182 additional safety layers 210 which may be made of a fluid impervious material or of a material with a higher fluid flow resistance in radial direction then is observed with the sheet material 183.

On the outer peripheral surface 186 a compressing sheet 212 may be used which may of a grid like structure so as to cover most of the outer peripheral surface 186 without obstructing fluid flow from the outer peripheral surface into the inlet channels 192.

The module 180 is similarly to the embodiment in FIG. 3 encased in a housing 220 which is essentially constituted from a bottom plate 222, a top plate 224 as well as a cylindrical wall 226.

The top and bottom plates 224, 222 are provided with openings 228 for feeding non-filtrate into the interior space of housing 220.

The bottom plate 222 has a central opening 230 which essentially registers with the passage 192 of body 182 in order to drain the filtrate from housing 220.

Figure 5:
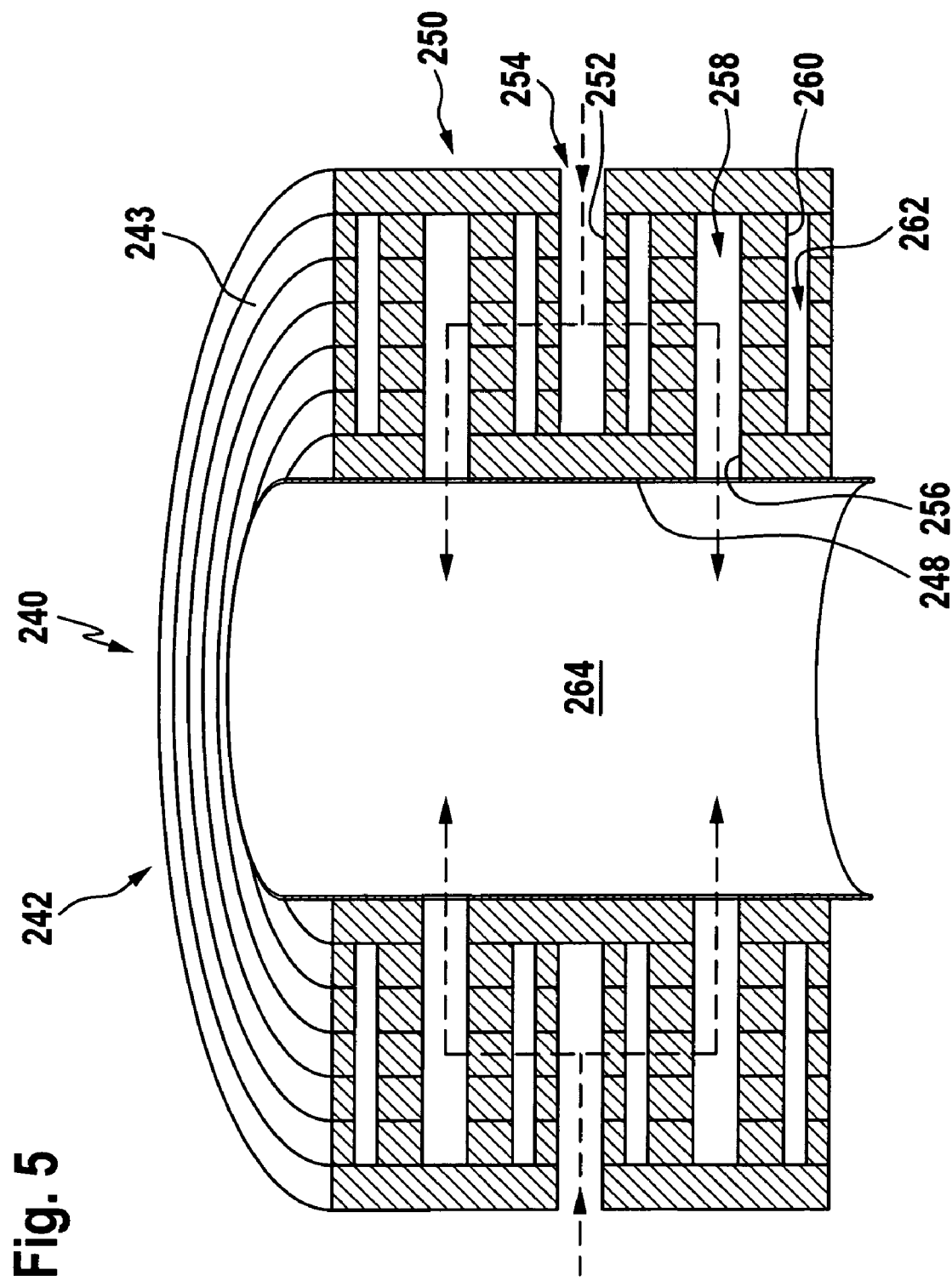
FIG. 5: a partial cross-sectional representation of a module according to a fifth embodiment of the present invention.

FIG. 5 shows an other embodiment of the present invention including a module 240.

Module 240 essentially consists of a body 242 of wound layers of a sheet material 243. The body has two end faces 244, 246 as well as an inner peripheral surface 248 and an outer peripheral surface 250.

The sheet material 243 comprises openings 252 providing inlet channels 254. Further, the sheet material 243 comprises openings 256 providing outlet channels 258 as described in a number of foregoing embodiments already.

In addition, the sheet material 243 comprises openings 260 forming treatment channels 262. Again, the inlet channels 254 are closed at their end towards the inner peripheral surface 248 and open at their end towards the outer peripheral surface 250 of body 242. Likewise, the outlet channels 258 are open at their end towards the inner peripheral surface 248 and closed at their end towards the outer peripheral surface 250. The outlet channels 258 drain the fluid to be processed into a common passage 264 collecting the filtered fluid.

Figure 6:
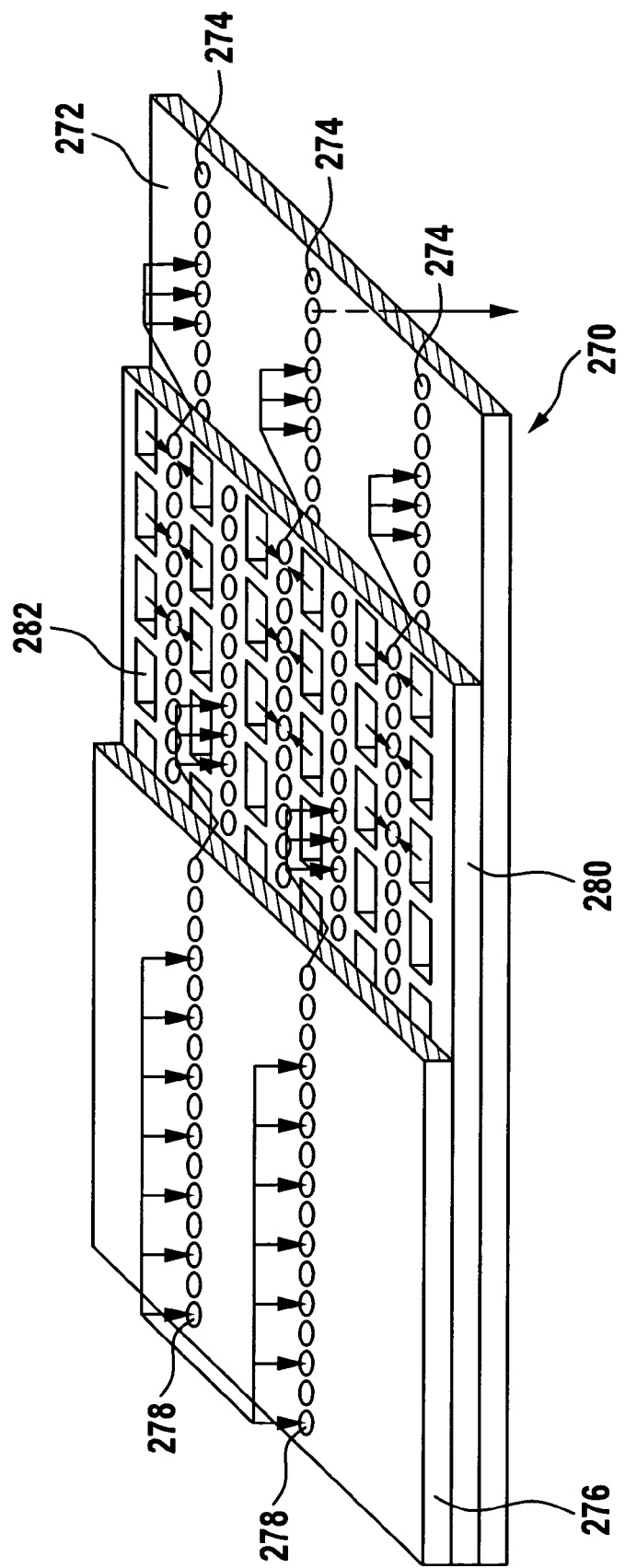
FIG. 6: a schematic representation of parts of several layers of sheet material of a module similar to the one of FIG. 3.

FIG. 6 provides a schematic representation for the arrangement of the openings in a sheet material 270 which is designed to form a module similar to the module 110 shown in FIG. 3.

A portion 272 of sheet material 270 which is to form an inner peripheral surface of the module is provided with openings 274 only which are to constitute channels corresponding to the outlet channels 120 of the module 110 of FIG. 3.

A portion 276 of sheet material 270 which is to form the outer peripheral surface of the module comprises only openings 278 which are to form channels like the inlet channels 116 of module 110 of FIG. 3.

An intermediate portion 280 of the sheet material 270 accommodates openings 274 as well as openings 278 contributing to inlet and outlet channels of the type shown in FIG. 3 for module 110.

In addition, the intermediate portion 280 of the sheet material 270 comprises rectangular shaped openings 282 which are to form treatment channels like the treatment channels 124 shown for module 110 in FIG. 3.

It is understood that when using the sheet material 270 as schematically represented in FIG. 6 with its three differently structured portions, namely the innermost portion 272 constituting the inner peripheral surface of the module, the intermediate portion 280 and the outermost portion 276 (forming an outer peripheral surface of the body of wound layers) a module will be obtained which is functionally identical with the module shown in FIG. 3.

The arrows provided in FIG. 6 show the fluid flow from the inlet openings 278 through the sheet material in the portion of 280 into the channels provided by the openings 282 from where the fluid penetrates the sheet material 270 to arrive at the openings 274 forming outlet channels.

Furthermore, it is apparent that the end faces of a module provided by sheet material 270 will also contribute to processing of the material and provide inlet surface area as is the case for module 110 in FIG. 3.

Figure 7:
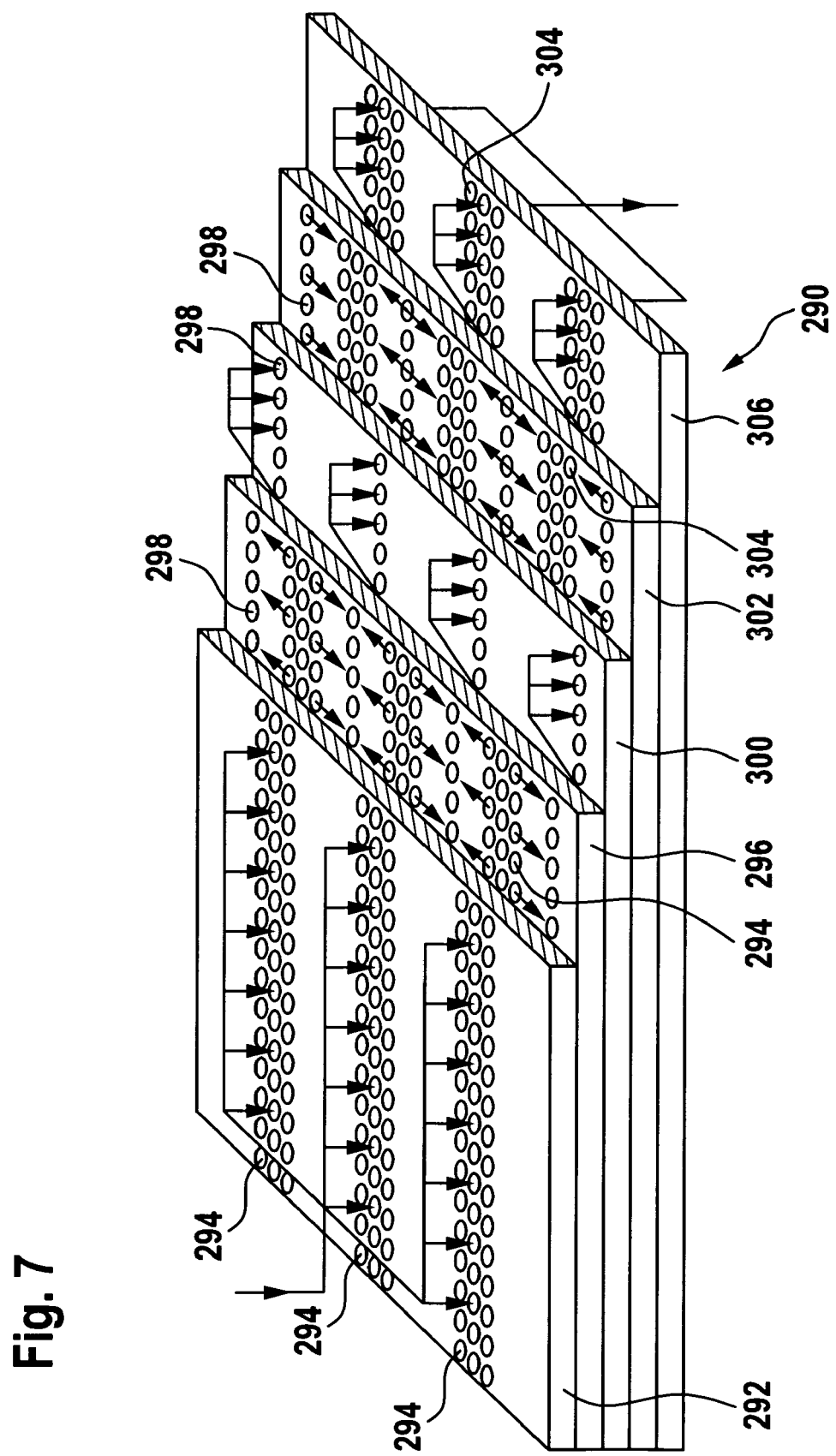
FIG. 7: a partial schematic representation of various layers of sheet material of a module according to a sixth embodiment of the present invention.

Similarly, FIG. 7 provides a schematic representation of a sheet material 290 designed and provided with openings in order to form a module for fluid processing according to another embodiment of the present invention.

The pattern of the openings provided in sheet material 290 is somewhat more complex than what is shown with sheet material 270 in FIG. 6.

Sheet material 290 comprises a first portion 292 which is to form an outer peripheral surface of a module. This portion 292 of sheet material 290 incorporates one type of openings 294 only which are arranged in groups of three parallel rows and which are to provide inlet channels for a module to be created from sheet material 290. The triple row arrangement of openings 294 provides for an increased surface area for the inlet channels optimizing capacity especially in filtration applications.

In a first intermediate portion 296 of sheet material 290, the sheet material 290 is provided in addition to the openings 294 with openings 298 which are to constitute treatment channels in a wound body of sheet material 290.

The arrows provided in FIG. 7 show the fluid flow from the inlet channels provided by openings 294 through the sheet material 290 into the treatment channels provided by openings 298.

In a second intermediate portion 300 of sheet material 290, no more openings of the type 294 are found, but only openings 298 forming treatment channels.

The function of the second intermediate portion 300 of sheet material 290 is to close the ends of inlet channels provided by openings 294 at their end directed towards the inner portion of a module and separating them from outlet channels as will be explained in more detail below.

In a third intermediate portion 302 of sheet material 290 still openings 298 for forming treatment channels are provided while in addition openings 304 are positioned in portions of the sheet material 290 where in the outermost portion 292 and the first intermediate portion 296 the openings 294 were located. In this portion 302 of sheet material 290, openings 304 serve for the purpose to provide outlet channels which may be in the triple line arrangement as shown in FIG. 7 or in a dual or even single line arrangement as has been described above in various embodiments of the present invention. Usually, the maximizing of the surface area for outlet channels is not so much needed and therefore the number of openings 304 or the number of lines of openings 304 may be smaller than the number of openings 294. Since the second intermediate portion 300 of the sheet material 290 does not have openings corresponding to openings 304, it provides for a closed end of the outlet channels formed by openings 304 in a radial direction towards the outer peripheral surface of the module.

Finally, in a portion 306 which is to form an innermost portion of a module according to the present invention, only the type of openings 304 is present so as to provide a closed end for the treatment channels constituted by openings 298 towards the inner peripheral surface of a module.

This innermost portion 306 of sheet material 290 only contains openings 304 in order to provide an open end of the outlet channels towards the inner peripheral surface of the module to be produced with this sheet material 290.

At their ends directed to the outer peripheral surface of the body, the treatment channels provided by openings 298 are covered by non-perforated portions of the outermost portion 292 of sheet material 290. Thus, the treatment channels provided by openings 298 are closed at both ends thereof, whereas inlet channels provided by openings 294 are open at the outer peripheral surface of the module to be produced and are closed towards their ends directed to the inner peripheral surface of the module.

In the present embodiment, similarly to what has been shown in FIG. 1, inlet and outlet channels are provided in the same disk-shaped portion of a body of wound layers of sheet material 290 which are separated from one another by non-perforated portions of sheet material (portion 300).

Figure 8:
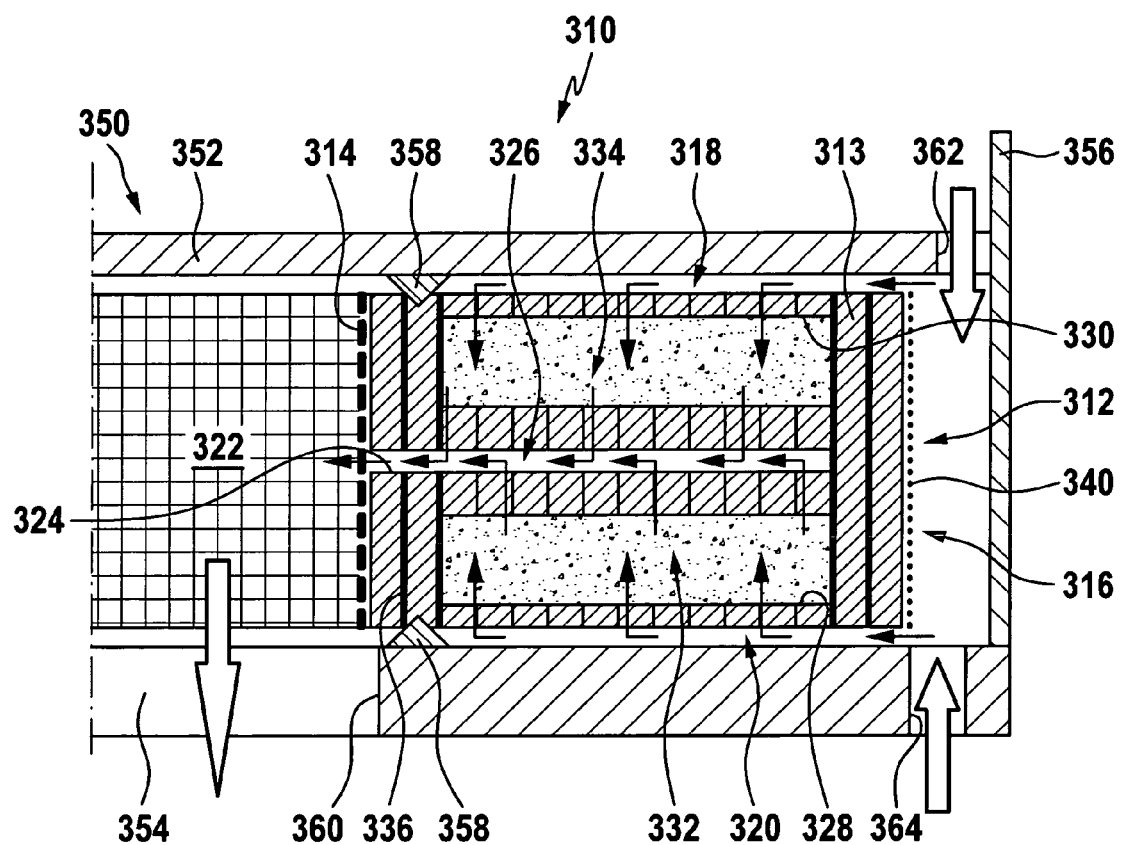
FIG. 8: a partial cross-sectional representation of a module according to a seventh embodiment of the present invention.

FIG. 8 provides a representation of a module 310 with the most simple design according to the present invention.

Module 310 comprises a body 312 of wound sheet material 313. The body 312 has an inner peripheral surface 314 and an outer peripheral surface 316 as well as end faces 318, 320.

The inner peripheral surface 314 defines a passage 322 which extends in axial direction through the whole of body 312. The sheet material 313 constituting the inner peripheral surface 314 of body 312 has only one type of openings 324 which are arranged in a single row and which are to provide outlet channels 326. The innermost two layers of sheet material 313 are only provided with this type of opening 324.

In the following windings of sheet material 313, further openings 328, 330 are provided which are to form treatment channels 332, 334. The outermost portion of sheet material 313 does not comprise any sort of openings and covers the outer ends of the treatment channels 332 and 334 as well as of outlet channels 326.

In this configuration of an inventive module, the end faces 318, 320 are providing essentially all of the surface area for fluid ingress into the body 312 of module 310.

The fluid passes then through portions of the sheet material 313 into the treatment channels 332, 334 where it is collected and then penetrates portions of the sheet material 313 to be collected in outlet channels 326.

These outlet channels 326 are open at their end directed towards the inner peripheral surface 314 and are drained by passage 322.

If need be, the innermost layers of sheet material 313 as well as the outermost layers of sheet material 313 may be accompanied by a security layer material 336 which may be fluid impervious or of a higher fluid flow resistance than the sheet material 313 in radial direction. In many cases the layers of sheet material alone will provide sufficient fluid flow resistance to guarantee the desired fluid flow pattern within the body 312.

It is noted here that the openings 328 and 330 may each form a continuous ring-shaped channel 332 and 334, respectively, extending all around passage 322.

Further, on the outer peripheral surface of body 312 a clamping means in the form of a strip-like material 340 may be applied in order to compress the sheet material 313 in its wound configuration and provide a tight contact of each of the layers of sheet material 313 within body 312 in order to avoid bypass problems.

The module 310 is incorporated in a housing 350 which is constituted of top and bottom plates 352, 354 as well as a cylindrical wall portion 356. The top and bottom plates 352, 354 are provided with projecting circular rims 358 which provide a seal of the housing 350 against the innermost portion of body 312.

The bottom plate 354 comprises a central opening 360 which is essentially coextending in radial direction with passage 322.

Top and bottom plates 352, 354 furthermore include feed openings 362, 364 which provide an access to the interior of housing 350 and the volume within housing 350 accommodating the major portion of body 312.

The fluid flow is indicated by arrows which show that the inflowing fluid distributes all around the body 312 and contacts the end faces 318, 320 from where it penetrates into the sheet material 313 to follow the fluid flow as described above.

The process according to the present invention is described in the following for a cellulosic sheet material to be used to form a body 372 of a module according to the present invention with reference to FIG. 9. Such sheet material 374 is provided from a storage roll (not shown) and travels from that storage roll to a punching machine (not shown), comprising a punching tool for forming the openings for the inlet and outlet channels as well as the treatment channels of the module to be created.

Preferably, the punching tool comprises compression elements (not shown) to allow compression of the sheet material 374 around the areas of opening forming inlet channels and/or outlet channels. Downstream of the punching machine, the punched sheet material is provided to a winding machine 370 which takes up the punched sheet material 374 and winds it to the final module.

During the winding process, it is important to ensure close contact between the adjacent layers of sheet material 374 and to apply a compression force in radial direction by a conveyor belt 390 as indicated by the plurality of radially oriented arrows in FIG. 9.

Preferably, the conveyor belt 390 does not create friction and the area in which the compression force is applied and sensed by the sheet material upon winding and is slidably guided on rollers 392, 394 of the winding machine 370.

The punching tool is operated such as to create in the beginning of the winding process only openings for channels which are to communicate with passage of the module, but not such openings which are to form treatment channels and channels of the type which will be in communication with the outer peripheral surface of the body of the module.

This punching operation will be continued until a length of sheet material has been punched which will form approximately two layers or more of the body of wound sheet material of the innermost portion of the body of module.

Thereafter, the punching operation of the punching machine will be switched to full operation, i.e., punching not only the openings for the channels open to the passage and the inner peripheral surface of module, but also the openings for channels to open to the outer peripheral surface of module and such openings forming treatment channels.

Near the end of the winding process, the punching operation is again changed such that only openings forming channels, which are open to the outer peripheral surface of the module, will be produced, but openings forming channels which open to the passage of the module and treatment channels will no longer be produced anymore.

This operation is continued for such a time that approximately two or more layers of sheet material are being wound on the body of module, which only comprise the openings forming channels which open to the outer peripheral surface of the body of module.

FIG. 9 demonstrates by way of a schematic representation of an apparatus 370 how to produce a module 372 according to the invention. As indicated in FIG. 9, the module 372 is made up of a plurality of layers of round sheet material 374 which in its innermost, outermost and intermediate portion may differ in its fluid flow resistance at least in its fluid flow resistance in radial direction of body 372.

An innermost portion 376 is provided with a sheet material which is preferably impervious to fluid to be filtered in radial direction and constitutes at least two windings of body 372. This portion of the body 312 includes openings for forming one type of channels, preferably outlet channels (not shown).

The subsequent portion of the body comprises different types of openings to form at least one of the type openings or inlet channels and, in any case, treatment channels (not shown).

In the outermost portion 380, the sheet material 374 used to complete the body 372 is again of a different fluid flow resistance for the fluid in radial direction of body 372.

FIG. 9 shows a status of body 372 shortly before its completion where part of the outer peripheral surface of body 372 is already made up of the sheet material 374 modified to provide the outer peripheral portion 380 of body 372. Prior to continuing the winding of the sheet material 374 the winding operation is preferably interrupted and by way of the feeding hose 384 treatment channels within body 372 which are not yet closed at their outer ends are filled with a treatment material in particulate form. The treatment material (not illustrated in FIG. 9) may be filled into the cavities of the treatment channels within body 372 by a stream of air feeding particulate treatment material into the cavities of the treatment channels.

If the treatment channels are not in the form of ring-shaped cavities so that they are accessible at specific circumferential positions only, the body 372 may be stopped at different positions for feeding the particulate material into the cavities of the treatment channels.

After all cavities of the treatment channels have been filled with particulate material, the winding operation may continue and sheet material 374 will be used to close the outermost ends of the treatment channels of body 372.

Again, it is recommended to have at least two windings of sheet material 374 providing the outermost portion of the body 372. During the winding operation, the body of wound sheet material 374 is contained and guided within a device which includes a conveyor belt 390 which presses against the outer surface of the body of wound layer's sheet material 374. The conveyor belt 390 is slidingly supported by rollers 392, 394 during the winding operation.

Once the winding of body 372 is completed, straps or other securing means are positioned around the outer peripheral surface of body 372 in order to keep the sheet material 374 in a compressed state.

Particularly preferred particulate materials for the treatment material accommodated in the cavities of the treatment channels are kieselguhr, perlite, bentonite, activated carbon, zeolite, micro crystalline cellulose and PVPP.

Precoating of the inlet channels further provides for a versatile means to adapt the properties of the module of the present invention to various treatment and/or filtration tasks.

Treatment of fluid may be performed by an inventive module taking advantage of the filtration characteristic of the body or not.

The combined filtration characteristics of the sheet material (filter media) the contents of the treatment channels and optionally a precoat depend on many factors including the nature of the process fluid and the flow, pressure, and temperature specifications of the filtration process.

In many processes, optimal performance is obtained when the precoat remains thin compared to the size of the openings forming the inlet channels. However, depending on the porosity and other characteristics of the precoat, an optimal process may be to completely or nearly completely fill such openings.

As noted before, the end portions of the sheet material may be in tapered form such that the front portion of the sheet material, which is wound to form the module in the winding machine, will not create a step-like structure in the body of the module, but will allow a smooth winding of the sheet material in spiral form. Also the very end portion of the sheet material which is wound on the body of module will have a tapered section such that there is smooth surface achieved on the outer peripheral surface of the module, avoiding a stepwise structure and ensuring that the compression elements fixed on the outer peripheral surface of module will closely abut against all of the surface portions they are surrounding.

The compression force imparted on the sheet material when wound in winding machine, may be adjusted in order to obtain the desired degree of compression of the body of the module.

The degree of compression is determined by the proposed application and the nature of the sheet material used in this winding process.

The invention claimed is:

1. A module for processing a fluid comprising a body of wound layers of a sheet material, the body having a winding axis,
   said body having an inner and an outer peripheral surface, a first and a second end face and a passage extending along the winding axis of said body and in fluid communication with said inner peripheral surface,
   said sheet material having a plurality of openings formed therein,
   said openings forming at least three types of channels within the wound layers of sheet material of said body,
   said channels extending in a direction from the inner peripheral surface to the outer peripheral surface,
   a first type of channel(s) being open at one end at said outer peripheral surface of the body and closed at the other end located adjacent to said inner peripheral surface,
   a second type of channel(s) being open at one end at said inner peripheral surface of the body, in fluid communication with said passage and closed at the other end located adjacent to said outer peripheral surface,
   a third type of channel(s) being closed at both ends thereof, said channel(s) of the third type being positioned in said body such as to receive fluid from one or more channels of the first or second type, whereas one or more channels of the other one of the first and second type of channels receives fluid from the third type of channels,
   said channel(s) of the one type being separated from the channel(s) of the respective other types by portions of sheet material,
   the first or second type of channel(s) forming inlet channels and communicating with a fluid inlet of said module, the other type of the first and second channel(s) forming outlet channels and communicating with an outlet of said module.

2. The module of claim 1, wherein the inlet and outlet channels are positioned in the body such that they do not intersect the same layers of sheet material.

3. The module of claim 2, wherein the inlet and outlet channels are positioned in the areas of the body radially separated by one or more separating layers of sheet material.

4. The module of claim 3, wherein at least one of the separating layers is impervious to the fluid in radial direction of the body.

5. The module of claim 3 wherein said one or more separating layers are pervious to the fluid in radial direction of the body.

6. The module of claim 1, wherein the ratio of radial extensions of the inlet and outlet channels in the body ranges up to 80:10.

7. The module of claim 2, wherein the portion of the body accommodating the inlet channels is manufactured from a first sheet material whereas the portion of the body accommodating the outlet channels is manufactured from a second sheet material which is different from the first sheet material.

8. The module of claim 1, wherein the portion of the body accommodating the outlet channel constitutes a security zone.

9. The module of claim 2, wherein the inlet and outlet channels are located in essentially the same ring shaped area(s) of the body whereas the third type of channels is located in area(s) distinct from said ring shaped area(s).

10. The module of claim 1, wherein each type of channels is positioned in the body in distinct ring shaped portions of the body.

11. The module of claim 1, wherein a majority of the openings forming the inlet channels incompletely register with corresponding openings of an adjacent layer.

12. The module of claim 11, wherein at least 75% of the openings forming the inlet channels incompletely register with the corresponding openings of an adjacent layer.

13. The module of claim 1, wherein the number of inlet channels is higher than the number of outlet channels.

14. A module for processing a fluid according to claim 1, wherein said first type of channels is functionally represented by said first and second end faces of the body,
   said third type of channels is provided in a first and a second ring shaped portion of said body,
   said second type of channels is provided in a third ring shaped portion of said body,
   said third ring shaped portion of said body is positioned in axial direction of said body in between said first and said second ring shaped portions, and
   said body consisting of said three ring shaped portions.

15. The module of claim 1, wherein the third type of channels extends essentially over the whole radial distance between the inner and outer peripheral surfaces.

16. The module of claim 1, wherein at least one of the channels of the third type includes an indicator for monitoring the processing of the fluid.

17. The module of claim 16, wherein the indicator includes a sensing element selected from pressure sensing elements, temperature sensing elements, redox sensing elements, pH sensing elements and/or electrical conductivity sensing elements.

18. The module of claim 16, wherein the indicator includes signal transmission means.

19. The module of claim 18, wherein the indicator includes wireless transmission means.

20. The module of claim 1, wherein the channels of the third type accommodate a particulate treatment agent, selected from filter aids, absorption material, adsorption material, reagents and catalytic components.

21. The module of claim 1, wherein said openings are separated from one another by stays of sheet material.

22. The module of claim 1, wherein at least one of the channels is provided in the form of a continuous ring-shaped cavity.

23. The module of claim 1, wherein said sheet material is a porous filter material which is maintained in a compressed state, such that said body of wound layers constitutes a filter unit.

24. The module of claim 23, wherein the porous filter material is a depth filter material and said body of wound layers constitutes a depth filter unit.

25. The module of claim 23, wherein the compression of the sheet material is such that the thickness of the compiled layers of the body amounts to 99% or less of the thickness of the same number of individual layers of sheet material.

26. The module of claim 25, wherein the thickness of the compiled layers amounts to 85% or more of the thickness of the same number of individual layers of sheet material.

27. The module of claim 1, wherein the sheet material comprises a matrix including a compressible material and/or a material which swells in contact with the fluid to be treated.

28. The module of claim 1, wherein the sheet material comprises a matrix incorporating an additive, said additive being in particulate form.

29. The module of claim 28, wherein the additive comprises an essentially incompressible particulate component, while the matrix of the sheet material includes a compressible material and/or a material which swells in contact with the fluid to be treated.

30. The module of claim 1, wherein the sheet material comprises a matrix said matrix including organic polymer material.

31. The module of claim 1, wherein the inner peripheral surface of the body is supported by a hollow support member.

32. The module of claim 1, wherein the sheet material as areas at the edge of the openings forming the first or second type of channels, the thickness of which is smaller than the thickness of the sheet material remote from those openings.

33. The module of claim 32, wherein a first strip-like element of a macro-porous material is co-wound with the sheet material to cover the areas of the sheet material comprising the openings forming said first or second type of channels.

34. The module of claim 33, wherein the sheet is compressed on both sides thereof.

35. The module of claim 32, wherein a second strip-like element is co-wound with the sheet material to cover the areas of the sheet material comprising the openings forming the third type of channels, said strip-like element having openings to essentially register with the openings of the sheet material.

36. The module of claim 35, wherein the second strip-like element accommodates an indicator.

37. The module of claim 1, wherein said module comprises a clamping means positioned on the outer peripheral surface of the body, said clamping means maintaining the sheet material in a compressed state.

38. The module of claim 1, wherein the sheet material consists of a tape having a first end portion and a second end portion, wherein at least one of these end portions of the tape has a smaller thickness than those portions of the tape in between those two end portions.

39. The module of claim 38, wherein at least one of the first and second end portions of the tape has a tapering cross-section in the lengthwise direction of the tape.

40. A process for the manufacturing of a module comprising a body of wound layers of a sheet material, the body having a winding axis, said body having an inner and an outer peripheral surface, a first and a second end face and a passage extending along the winding axis of said body and in fluid communication with said inner peripheral surface, said sheet material having a plurality of openings formed therein, said openings forming at least three types of channels within the wound layers of sheet material of said body, said channels extending in a direction from the inner peripheral surface to the outer peripheral surface, a first type of channel(s) being open at one end at said outer peripheral surface of the body and closed at the other end located adjacent to said inner peripheral surface, a second type of channel(s) being open at one end at said inner peripheral surface of the body, in fluid communication with said passage and closed at the other end located adjacent to said outer peripheral surface, a third type of channel(s) being closed at both ends thereof, said channel(s) of the third type being positioned in said body such as to receive fluid from one or more channels of the first or second type, whereas one or more channels of the other one of the first and second type of channels receives fluid from the third type of channels, said channel(s) of the one type being separated from the channel(s) of the respective other types by portions of sheet material, the first or second type of channel(s) forming inlet channels and communicating with a fluid inlet of said module, the other type of the first and second channel(s) forming outlet channels and communicating with an outlet of said module wherein the sheet material is wound around a support element to form a body of a multiplicity of consecutive layers with an inner peripheral surface and an outer peripheral surface, said sheet material being compressed by a compression force when wound around the winding axis to provide intimate contact of each of the layers to the neighbouring layer(s), said compression force being applied in a radial direction by a roller.

41. The process of claim 40, comprising forming the openings in the sheet material and reducing the thickness of the sheet material to a predetermined value in areas where openings are provided for forming inlet channels.

42. The process of claim 41, wherein a compressible sheet material is used, said winding the sheet material comprises co-winding a macroporous essentially incompressible first strip-like element with the sheet material.

43. The process of claim 40, wherein the winding comprises feeding a particulate component into the channels of the third type prior to closing these channels at their second end.

44. The process of claim 43, wherein the particulate component comprises a treatment agent, selected from filter aids, absorption material, adsorption material, reagents and catalytic components.

* * * * *